US012752414B2

(12) United States Patent
Randecker et al.

(10) Patent No.: US 12,752,414 B2
(45) Date of Patent: Oct. 6, 2026

(54) CONNECTOR ARRANGEMENT FOR A GUIDE RAIL ARRANGEMENT

(71) Applicant: FESTOOL GMBH, Wendlingen (DE)

(72) Inventors: Andreas Randecker, Dettingen/Erms (DE); Jonathan Weik, Filderstadt (DE)

(73) Assignee: FESTOOL GMBH, Wendlingen (DE)

( * ) Notice: Subject to any disclaimer, the term of this patent is extended or adjusted under 35 U.S.C. 154(b) by 438 days.

(21) Appl. No.: 18/284,157

(22) PCT Filed: Mar. 31, 2022

(86) PCT No.: PCT/EP2022/058597
§ 371 (c)(1),
(2) Date: Sep. 26, 2023

(87) PCT Pub. No.: WO2022/207803
PCT Pub. Date: Oct. 6, 2022

(65) Prior Publication Data

US 2024/0149427 A1 May 9, 2024

(30) Foreign Application Priority Data

Apr. 1, 2021 (DE) ..................... 10 2021 108 446.6

(51) Int. Cl.
*B25H 1/00* (2006.01)

(52) U.S. Cl.
CPC .................................. *B25H 1/0078* (2013.01)

(58) Field of Classification Search
CPC .................................................... B25H 1/0078
See application file for complete search history.

(56) References Cited

U.S. PATENT DOCUMENTS 5,138,759 A 8/1992 Gruetzmacher
6,298,633 B1 10/2001 McCorkle et al.
(Continued)

FOREIGN PATENT DOCUMENTS

DE 89 05 442 6/1989
DE 89 05 442 U1 6/1989
(Continued)

OTHER PUBLICATIONS

International Search Report.
(Continued)

*Primary Examiner* — Moshe Wilensky
(74) *Attorney, Agent, or Firm* — Hoffmann & Baron, LLP

(57) ABSTRACT

A connector arrangement for connecting two guide rails of a guide rail assembly for guiding a hand-held power tool, wherein the guide rails extend along longitudinal axes and can be releasably connected to each other by the connector arrangement on mutually opposite end faces, wherein the guide rails have at mutually opposite sides a contact face for the guide rails to rest on a workpiece and a guide face for guiding the hand-held power tool, wherein the guide rails have a longitudinal guide face extending parallel to their respective longitudinal axis for guiding the hand-held power tool parallel to the respective longitudinal axis, wherein the longitudinal guide face is at an angle to the guide face, wherein the connector arrangement has at least one connector element which has plug-in sections provided for inserting into plug-in receptacles on the opposite end faces of the guide rails on which there are arranged clamping devices for clamping in the relevant plug-in receptable.

24 Claims, 6 Drawing Sheets

(56) References Cited

U.S. PATENT DOCUMENTS

| | | | |
|---|---|---|---|
| 2003/0233925 | A1 | 12/2003 | Makropoulos |
| 2013/0247738 | A1 | 9/2013 | Stoffel |

FOREIGN PATENT DOCUMENTS

| | | | |
|---|---|---|---|
| DE | 10 2004 017 420 | A1 | 11/2005 |
| DE | 10 2006 030 825 | | 1/2008 |
| DE | 10 2006 030 825 | A1 | 1/2008 |
| DE | 10 2006 057 951 | | 6/2008 |
| DE | 10 2006 057 951 | A1 | 6/2008 |
| DE | 10 2011 114 375 | | 3/2013 |
| DE | 10 2011 114 375 | A1 | 3/2013 |
| DE | 10 2015 107 720 | B3 | 6/2016 |

OTHER PUBLICATIONS

German Search Report.
Chinese Office Action dated Sep. 26, 2025.
Second Chinese Office Action dated Mar. 19, 2026.

CONNECTOR ARRANGEMENT FOR A GUIDE RAIL ARRANGEMENT

This application is a National Stage application based on International Application No. PCT/EP2022/058597, filed Mar. 31, 2022, which claims priority to DE 102021108446.6, filed Apr. 1, 2021.

BACKGROUND OF THE INVENTION

The invention relates to a connector arrangement for connecting two guide rails of a guide rail assembly for guiding a hand-held power tool, wherein the guide rails extend along longitudinal axes and can be releasably connected to each other by the connector arrangement on mutually opposite end faces, wherein the guide rails have at mutually opposite sides a contact face for the guide rails to rest on a workpiece and a guide face for guiding the hand-held power tool, wherein the guide rails have a longitudinal guide face extending parallel to the longitudinal axis for guiding the hand-held power tool parallel to the respective longitudinal axis, wherein the longitudinal guide face is at an angle to the guide face, wherein the connector arrangement has at least one connector element which has plug-in sections provided for inserting into plug-in receptacles on the opposite end faces of the guide rails on which sections there are arranged clamping devices for clamping in the relevant plug-in connector.

Such a connector arrangement is used by the applicant for connecting guide rails. The connector elements can be inserted in grooves by guide projections on the guide rails and clamped there by means of the clamping devices. For this there are screws, for example grub screws, arranged on the connector elements, which are supported on the base of the respective groove, so that the connector element is clamped between the base of the groove and support projections which protrude in front of the groove and parallel to the base of the groove. That said, the alignment of the guide rails using the known connector elements is difficult.

Further connector elements for guide rails are explained in DE 10 2006 030 825 A1, DE 89 05 442 U1 or DE 10 2006 057 951 A1.

SUMMARY OF THE INVENTION

The present invention is therefore based on providing an improved connector arrangement for connecting two guide rails.

To solve this problem, it is provided in a connector arrangement of the type mentioned at the beginning that the clamping devices of the connector arrangement are designed for sequential clamping first with a parallel clamping force approximately or exactly parallel to the guide face, so that the longitudinal guide faces of the guide rails are in alignment with one another, and subsequently with a vertical clamping force component vertical to the guide face.

The parallel clamping force is preferably exactly parallel to the guide face. The parallel clamping force can additionally, however, be at an incline to the guide face at an angle slightly deviating from 0 degrees of, for example, maximum 5 degrees, in particular maximum 3 degrees, preferably maximum 2 degrees or maximum 1 degree.

The vertical clamping force component is advantageously vertical to the parallel clamping force or vertical to the guide face.

The vertical clamping force component can be a part of a vertical clamping force that also comprises a parallel clamping force component. The clamping force components can, for example, be vectorial parts of a whole clamping force, which are ap-plied after application of the parallel clamping force for aligning the longitudinal guide faces of the guide rails with each other. As a result, the vertical clamping force component is advantageously substantially larger than the parallel clamping force component, for example at least two or three times larger.

Preferably, the vertical clamping force component is or comprises exclusively a vertical clamping force which is vertically or approximately vertically aligned, for example at an angle between 87 degrees and 93 degrees, to the parallel clamping force or to the guide face.

It is therefore a basic idea that the clamping devices first align the two guide rails, which are to be connected by the connector arrangement, parallel to their guide face, so that the longitudinal guide faces of the guide rails align with each other and so the hand-held power tool can be optimally guided on the connected guide rails. This enables precise machining of the workpiece, for example saw cuts in the workpiece. Through the additional vertical clamping with the vertical clamping force component, however after the clamping parallel to the guide face, the two connected guide rails are also firmly connected to each other, as it were, in the height axis. The parallel clamping force and the vertical clamping force components are at an angle to each other, for example at a right angle.

The longitudinal guide face protrudes for example in front of the guide face, for example if it is arranged on a guide projection, or retracts behind the guide face in the direction of the contact face, for example if it is arranged on a guide groove.

The longitudinal guide face and the guide face are for example at a right angle to each other, wherein oblique angles are also possible.

It is advantageous if the clamping devices are designed to clamp with the vertical clamping force component while retaining the alignment of the longitudinal guide faces. It is also advantageous therefore if the alignment of the longitudinal guide faces is retained if the clamping is performed with the vertical clamping force component.

It is preferred if the at least one connector element has an elongated shape.

It is furthermore advantageous if at least one plug-in receptacle on one longitudinal side transverse to the plug-in opening has an assembly opening for operating the vertical clamping device or the parallel clamping device on the plug-in section of the connector element inserted in the plug-in receptacle. For example, the assembly opening is designed as a longitudinal slot.

The connector element extends for example along a longitudinal axis. A transverse width of the connector element or transverse height of the connector element transverse to the longitudinal axis is advantageously smaller than the longitudinal axis. For example, the longitudinal axis of the connector element is at least four times larger, preferably at least six times larger, more preferably at least eight times larger than a transverse width and/or a transverse height of the connector element transverse to the longitudinal axis.

The at least one connector element can also be rod-shaped.

It is advantageous if the at least one connector element has a cuboid, elongated form.

The at least one connector element has preferably a right-angled or quadratic cross-section transverse to its longitudinal axis.

It is advantageous if a free end region of the plug-in section or a plug-in end or a longitudinal end of the connector element is rounded off and/or has lead-in chamfers. This facilitates the insertion of the connector element in the respective plug-in receptacle.

Advantageous measures for sequential clamping with the parallel clamping force and subsequently the vertical clamping force component are presented below:

A preferred concept provides that the connector arrangement has at least one parallel clamping device for clamping exclusively with the parallel clamping force and one vertical clamping device which is separate from the parallel clamping device for clamping exclusively with the vertical clamping force component. The idea here is that the parallel clamping device in the plug-in receptacle, in which the connector element with the parallel clamping device is inserted, provides clamping exclusively with the parallel clamping force, and no clamping force vertically to the guide face, therefore also no vertical clamping force component. The vertical clamping force component can be adjusted with the vertical clamping device according to the parallel clamping force.

In principle, it is possible therefore that the connector element with the parallel clamping device or the section of the connector element with the parallel clamping device is aligned in the plug-in receptacle vertically to the guide face and/or is supported in the plug-in receptacle vertically to the guide face, although not clamped or clampable in the plug-in receptacle with a vertical clamping force component. The connector element can therefore be supported in the plug-in receptacle vertical to the guide face in an interlocking manner, however not clamped.

The vertical clamping device, additional to the parallel clamping device and separate from the parallel clamping device, can be supported parallel to the guide face in the plug-in receptacle, in which the connector element with the vertical clamping device is inserted, and/or can be located on the plug-in receptacle parallel to the guide face. The vertical clamping device is however clamped or able to be clamped in its clamping position exclusively with a vertical clamping force component.

The parallel clamping device and the vertical clamping device can be arranged on separate connector elements and/or on separate plug-in sections of the same connector element. It is however also possible that the parallel clamping device and the vertical clamping device are arranged on one single connector element.

It is possible that the vertical clamping device and the parallel clamping device are arranged on separate plug-in sections, i.e. that, for example, the vertical clamping device is arranged on a first longitudinal end region or plug-in section and the parallel clamping device is arranged on a second longitudinal end region which is opposite the first longitudinal end region or plug-in section of a connector element. It is also possible therefore that the connector arrangement has a connector element that has a plug-in section on each of the mutually opposite longitudinal end regions, wherein the one plug-in section has a parallel clamping device and the other plug-in section has a vertical clamping device. On the plug-in section with the parallel clamping device there is solely the parallel clamping device and on the plug-in section with the vertical clamping device there is solely the vertical clamping device. Therefore, the plug-in sections are equipped either with a dedicated vertical clamping device or a parallel clamping device.

Furthermore, two connector elements or several connector elements can for example be provided.

An embodiment can provide that the connector arrangement has a first connector element and a second connector element, on which there are arranged on the plug-in sections of the connector elements either exclusively a parallel clamping device or exclusively a vertical clamping device.

For example, as already explained, a connector element can have on one plug-in section a vertical clamping device and on the other plug-in section a parallel clamping device. Such two connector elements then form a first and second connector element of the connector arrangement.

The following design is however also possible:

It is advantageously provided that the connector arrangement has a first connector element, forming a parallel connector element, on the plug-in sections of which there are arranged exclusively parallel clamping devices, and a second connector element, forming a vertical connector element, on plug-in sections of which there are arranged exclusively vertical clamping devices. The idea here is that each connector element performs different functions. So the parallel connector element can for example first be clamped or tensioned with the guide rails to align the guide rails to be connected in parallel. Through the second connector element or vertical connector element, the guide rails are subsequently tensioned or clamped with the vertical clamping force component vertical to the guide face.

For example it is provided that two connector elements are inserted in each of the guide rails, wherein one plug-in section with a parallel clamping device and one plug-in section with a vertical clamping device is inserted in the guide rail. As a result, each guide rail is fixed both parallel to the guide face as well as vertical to the guide face by means of the clamping devices of two or more connector elements.

It is advantageous if the first and second connector element are equally shaped, with the exception of the clamping devices. In particular, it is advantageous that the outer peripheral contours of the connector elements are equal. In particular, it is advantageous if the connector elements have equally long/or the same cross-sections. For example, both connector elements can be rod-shaped.

Both above-mentioned embodiments are as a rule provided at least two connector elements for connecting two guide rails. For the embodiments below a single connector element is sufficient, although connecting two or more connector elements is entirely possible.

One advantageous concept provides for example that the connector arrangement has at least one connector element with a plug-in section, on which there is arranged a parallel clamping device and a vertical clamping device. For example, the parallel clamping device and the vertical clamping device are arranged behind each other or adjacent to each other with respect to the longitudinal axis of the connector element and/or with respect to an insertion axis, along which the plug-in section can be inserted in a plug-in receptacle of a guide rail.

It is however also possible that the parallel clamping device comprises the vertical clamping device or that a clamping device is provided, which performs the function of a vertical clamping device and the function of a parallel clamping device and/or is designed for sequential clamping first with the parallel clamping force and subsequently with the vertical clamping force component. This becomes clearer below.

An advantageous embodiment provides that the connector arrangement has at least one clamping device, which has a parallel clamping body for clamping in the plug-in receptacle with the parallel clamping force and one vertical clamping body separate from the parallel clamping body for clamping in the plug-in receptacle with the vertical clamping force component. A sequential application of force is facilitated by the functional separation of parallel clamping bodies and vertical clamping bodies, in which first the alignment of the longitudinal guide face parallel to the guide face by means of the parallel clamping force takes place followed by the clamping of the guide rails with the vertical clamping force component.

In this way it is possible that the parallel clamping body and the vertical clamping body are structurally divided from each other and/or separated from each other in a manner that the parallel clamping body can be moved into a clamping position by use of a parallel clamping force and independent of any operation of the vertical clamping body and the vertical clamping body can be moved into a clamping position by use of the vertical clamping force component and independent of any operation of the parallel clamping body.

Preferred is a concept in which it is provided that the vertical clamping body forms an operation element for the parallel clamping body. The vertical clamping body can thereby first move the parallel clamping body from a release position into a clamping position, i.e. to exert the parallel clamping force. Subsequently, the vertical clamping body can be moved from the first operation position into a second operation position, in which it can exert the vertical clamping force component in the plug-in receptacle, when the clamping device with the vertical clamping body and parallel clamping body is arranged in the plug-in receptacle of a guide rail. For example, the vertical clamping body can be moved from a first operation position, in which the parallel clamping body adopts a release position, in which the at least one connector element is mov-able with respect to the plug-in receptacle, into a second operation position, in which the parallel clamping body adopts a clamping position and is supported on the plug-in receptacle with the parallel clamping force, wherein the vertical clamping body in the second operation position is not engaged with the plug-in receptacle, and that the vertical clamping body can be operated from the second operation position into a vertical clamping position, in which the vertical clamping body is supported on the plug-in receptacle with a vertical clamping force component.

An advantageous design of the invention can therefore provide that the vertical clamping body forms an operation element for the parallel clamping body, wherein the vertical clamping body can be moved from a release operation position into a parallel clamping operation position, wherein in the release operation position the vertical clamping body adopts a vertical release position and the parallel clamping body a parallel release position, wherein the vertical release position and the parallel release position are provided and arranged for moving the connector element with respect to the plug-in receptacle, and in the parallel clamping operation position the parallel clamping body adopts a parallel clamping position provided for and suitable for supporting the plug-in section with the parallel clamping force in the plug-in receptacle and the vertical clamping body adopts a vertical release position, and that the vertical clamping body can be operated from the parallel clamping operation position into a vertical clamping operation position, in which the vertical clamping body adopts a vertical clamping position provided for and suitable for supporting the plug-in section with the vertical clamping force component in the plug-in receptacle.

When the vertical clamping body is moved from the parallel clamping operation position into the vertical clamping operation position, the parallel clamping body remains in the parallel clamping position, so that the longitudinal guide faces of the guide rails align with each other. It is understood that the parallel clamping body can still be moved in the parallel clamping position by a predetermined degree, wherein however the longitudinal guide faces remain held in an aligned position.

An operation element is used for operating a parallel clamping device and/or a vertical clamping device from a release position into a clamping position. The operation element works for example on a clamping body or clamping section of the respective clamping device and moves it between the release position and the clamping position. The operation element can at the same time form a clamping body. For example, a free end region of a screw or other operation element can have a vertical clamping face.

It is preferred if the or an operation element of a respective vertical and/or parallel clamping device and/or vertical clamping body is designed as a screw or comprises a screw. A screw can be operated easily. The screw is preferably a grub screw. Alternatively, the operation element can for example also be an eccentric body.

Preferably a longitudinal end region of the screw provided for operating the screw in the clamping position of the respective vertical and/or parallel clamping device does not protrude in front of a screw receptacle of the connector element into which the screw is screwed. Here it must be mentioned that a clamping device can also have two operation elements for operating a respective clamping body or can present as a clamping body. For example, the operation elements can have a longitudinal distance from each other, in particular parallel to the longitudinal axis of a connector element and/or the guide rail, in which the plug-in section of the connector element engages.

A screw can form the operation element of the parallel clamping device and in addition a vertical clamping body. Thus, it is preferred if a longitudinal end region of the screw protrudes further in front of the connector element or a connector body of the connector element in the vertical clamping position than in then vertical release position. The longitudinal end region of the screw, which therefore forms a vertical clamping section, as well as a longitudinal end region of the screw provided for operating the screw, for example with a screw head or a receptacle for an arrangement tool, are preferably opposite longitudinal end regions of the screw. The screw has preferably a vertical clamping face on its free end face or the vertical clamping section.

The screw can for example have a screw section in the form of a cylinder. The screw can be screwed into a cylindrical screw receptacle of the connector element or connector body. The screw receptacle is for example arranged between a parallel clamping section, to be explained below, and the connector body.

In order for the vertical clamping body or the screw to be able to perform the function of the operation element for the parallel clamping body, it is advantageous if the screw has a conical outer circumference and/or the screw is received in a conical screw receptacle. By screwing in the screw into the screw receptacle the operation element or the screw can be moved for example into the parallel clamping operation position, by unscrewing the screw or the operation element can be moved for example into the release operation position.

It is advantageously provided that the at least one connector element has a connector body with a parallel clamping section, which is integral or firmly connected to the connector body and can be moved by an operation element between a parallel clamping position provided for and suitable for supporting the plug-in section with the parallel clamping force in the plug-in receptacle and a parallel release position, which is provided and designed for moving the connector element with respect to the plug-in receptacle.

The parallel clamping section can for example be arranged on an outer peripheral contour of the connector body and/or on a longitudinal side of the connector body or connector element. The longitudinal side is advantageously parallel to the longitudinal extent of the connector element or connector body. The longitudinal side is preferably a longitudinal narrow face of the connector element or connector body.

The parallel clamping section can for example be designed as a type of clasp or a flexible projection.

Between the parallel clamping section and the main body a slot can for example be provided.

It is preferred if the parallel clamping section at both of its longitudinal end regions is integral to the connector body or firmly connected to the connector body.

It is advantageous if on at least one longitudinal end region of the parallel clamping section which is integral or firmly connected to the connector body a movement gap is arranged, which facilitates a deflection of the parallel clamping section in the parallel clamping position. The movement gap is designed for example as a type of drill hole. It is preferred if on both longitudinal end regions of the parallel clamping section a movement gap is arranged on each. The movement gap can for example be a rounded or widened section opposite a slot between the parallel clamping section and the connector body. In particular, it is advantageous if the movement gap extends away from one longitudinal side of the connector body towards a centre of the clamping body.

It is advantageous if the operation element is arranged between the connector body and the parallel clamping section. In particular, it is advantageous if the operation element is arranged nearly concentric or exactly concentric between longitudinal end regions of the parallel clamping section.

It is advantageous if the operation element for example is a screw, for example a grub screw or comprises a screw. As explained, it is advantageous if the screw has for example a conical screw section and/or is screwed in or can be screwed into a conical screw receptacle.

Preferably it is provided that the at least one connector element has parallel clamping faces for clamping with the parallel clamping force to parallel support surfaces of the plug-in receptacle, in which the connector body is inserted. The parallel clamping faces are for example arranged on longitudinal narrow sides of the connector element, which are opposite each other or averted from each other. One of the parallel clamping faces is for example arranged on the above-mentioned parallel clamping section. The other parallel clamping face can for example be stationary with respect to the connector body. The parallel clamping faces are preferably parallel to each other, wherein it is conceivable in principle, that a parallel clamping face has an inclination to other parallel clamping faces in particular at a very flat angle of maximum 5°.

It is preferred that the parallel clamping faces are parallel to each other and/or the parallel support surfaces are parallel to each other.

A preferred measure provides that the at least one connector element or all connector elements of the connector arrangement have longitudinal side faces or narrow sides at right angles to each other, which extend parallel to a longitudinal extent of the connector element and/or parallel to an insertion axis, along which the connector element can be inserted into the respective plug-in receptacle of a guide rail of the guide rail assembly.

It is advantageously provided that the at least one connector element has parallel clamping faces for clamping with the parallel clamping force onto parallel supporting surfaces of the plug-in receptacle, into which the connector body is inserted, wherein the parallel clamping faces are arranged vertical to the guide face and/or parallel to the longitudinal guide face, when the at least one connector element is inserted in the plug-in receptacle of a respective guide rail. The parallel clamping faces are for example arranged on opposite sides of the connector element or connector body. Such a parallel clamping face comprises for example a first and, with respect to the connector element or connector body, fixed clamping face, with which the connector body or the connector element on one side of the plug-in receptacle supports itself, and a second parallel clamping face, which is formed by the parallel clamping device or can be moved by the parallel clamping device in the direction of the parallel clamping position. The first parallel clamping face is therefore, with respect to the connector body or connector element, a fixed face whereas the second parallel clamping face is a clamping face, which can be moved between the parallel clamping position and the parallel release position.

Support surfaces extend preferably between the parallel clamping faces. The support surfaces are supported or can be supported in the plug-in receptacle of a guide rail which receives the respective plug-in section, however without a vertical clamping force component on the plug-in receptacle and therefore the guide rail. The support surfaces and the parallel clamping faces extend for example at right angles to each other.

The invention relates furthermore to a guide rail system or a guide rail assembly with a connector arrangement according to one of the above designs as well as two guide rails which can be connected to each other by the connector arrangement, wherein the guide rails each have on their end faces at least one plug-in receptacle for receiving the at least one connector element.

The plug-in receptacle is preferably designed as a type of groove or locating groove for inserting a respective connector element.

In particular, the guide rail has a guide rib or a guide projection, which extends along the longitudinal axis of the respective guide rail. A groove is advantageously formed in the guide rib or the guide projection, which provides a plug-in receptacle.

The guide rails of the guide rail assembly or the guide rail system are preferably designed as extruded parts or extruded bodies.

It is advantageously provided that the plug-in receptacle of at least one guide rail of the guide rail assembly has a side wall provided for supporting the connector element with respect to the parallel clamping force approximately or exactly parallel to the guide face, and where on the side which is averted from the plug-in receptacle the longitudinal guide face of the guide rail is provided. For example, the side wall is provided on a guide projection or a guide rib of the guide rail. The basic idea therefore is that a parallel clamping force is exerted, as it were, directly on such a side wall of the plug-in receptacle, on the side which is averted from the plug-in receptacle and provides the longitudinal guide face, and therefore must be optimally aligned with regard to the other guide rail. Advantageously, a respective guide rail has such a plug-in receptacle on both longitudinal end regions. In particular, it is advantageous if at least two guide rails of the guide rail assembly have such a plug-in receptacle, so that the guide rails can be aligned optimally with each other.

The insertion axes of the plug-in receptacles extend advantageously parallel to the longitudinal axis of the respective guide rail.

In particular, it is preferred when using several connector elements if the guide rail assembly has at least two guide rails, which each have on their end faces two plug-in receptacles for each receiving a connector element. The plug-in receptacles are for example arranged transversely to the longitudinal axis of the guide rail on a plane adjacent to each other, which extends between the guide face and the contact face. Both plug-in receptacles preferably have insertion axes, which extend parallel to the respective longitudinal axis of the respective guide rail.

A first plug-in receptacle is for example provided and designed for clamping with the parallel clamping force and a second plug-in receptacle for clamping with the vertical clamping force component.

It is therefore advantageous that the plug-in receptacle provided for clamping with the connector element with the parallel clamping force is arranged on or next to the longitudinal guide face of the respective guide rail, for example is arranged with the longitudinal guide face on a guide projection or a guide rib, while the other plug-in receptacle provided for clamping with the vertical clamping force component is spaced apart, for example at a transverse distance transversely to the longitudinal axis of the guide rail.

Here it must be noted that in principle more than two, for example three plug-in receptacles, can also be provided on a guide rail of the guide rail assembly and that the connector arrangement has a corresponding number of connector elements, for example three connector elements. It is therefore advantageous if only one connector element and a combination of plug-in receptacles are provided for clamping with the parallel clamping force and therefore for aligning the longitudinal guide faces with the connected guide rails, whereas the other plug-in receptacles and connector elements are provided for connecting and clamping with the vertical clamping force component.

It is advantageous if the plug-in receptacles of a guide rail are laterally open to sides which are opposite each other, averted from the end faces or at an angle to the end faces. For example, the plug-in receptacles have longitudinal slots which extend parallel to the longitudinal axis of the respective guide rail. It can advantageously be provided that the one plug-in receptacle is open to the guide face and the other plug-in receptacle is open to the contact face. It is also possible that both plug-in receptacles are open to the guide face or both plug-in receptacles are open to the contact face.

Furthermore, it is possible in principle that two or more connector elements of the connector arrangement are inserted or can be inserted in a plug-in receptacle of a guide rail. It is advantageously provided for example that the guide rail assembly has at least one guide rail with a plug-in receptacle, in which at least two plug-in sections of connector elements of the connector arrangement can be inserted. For example, connector elements or their plug-in sections can be inserted in the respective plug-in receptacle parallel adjacent to each other with respect to the guide face or vertically above each other with respect to the guide face. The one connector element has for example on its plug-in section inserted in the plug-in receptacle a parallel clamping device and the other connector element inserted in the same plug-in receptacle has on its plug-in section the vertical clamping device.

The following system constitutes an in itself separate invention. Here it must be mentioned that this system can readily have a guide rail or a guide rail assembly according to the above designs. It is therefore possible and advantageous that one or several guide rails of the guide rail assembly are, according to the above description, parts of the system explained below:

System comprising at least one guide rail which is provided for guiding a hand-held power tool, has an elongated shape and extends along a longitudinal axis, wherein the guide rail has, on mutually opposite sides, a contact face for the guide rail to rest on a workpiece and a guide face in front of which a longitudinal guide face extending along the respective longitudinal axis for guiding the hand-held power tool protrudes parallel to the longitudinal axis.

The system comprises a carrying device having a carrying body and a carrying handle located on the carrying body to be grasped by an operator, wherein the guide rail, for a connection to the carrying device, has form-fitting contours which can be brought into engagement with mating form-fitting contours of the carrying device, so that the guide rail can be carried by an operator using the carrying handle.

Using the carrying handle, the guide rail can be gripped comfortably. The form-fitting contours for example comprise at least one locating groove, in particular a locating groove at a guide projection having the longitudinal guide face. One or more hooks can be brought into engagement with the locating groove, acting as mating form-fitting contours of the carrying device.

The carrying handle is for example designed in the manner of a handhold or carrying leg or carrying handhold.

Also provided are a guide rail and a carrying device, which are defined as follows:

Carrying device for carrying a guide rail provided for guiding a hand-held power tool, wherein the carrying device has a carrying body and a carrying handle located on the carrying body to be grasped by an operator, having mating form-fitting contours for engagement with form-fitting contours of the guide rail, so that the guide rail can be carried by an operator using the carrying handle.

Guide rail which can be carried by a carrying device, wherein the guide rail has an elongated shape and extends along a longitudinal axis, wherein the guide rail has, on mutually opposite sides, a contact face for the guide rail to rest on a workpiece and a guide face in front of which a longitudinal guide face extending along the respective longitudinal axis for guiding the hand-held power tool protrudes parallel to the longitudinal axis, wherein the guide rail, for a connection to the carrying device, has form-fitting contours which can be brought into engagement with mating form-fitting contours of the carrying device, and wherein the carrying device has a carrying body and a carrying handle located on the carrying body to be grasped by an operator, so that the guide rail can be carried by an operator using the carrying handle.

It is for example advantageous if the carrying device has a support face for the planar support of the guide rail, in particular the contact face or the guide face of the guide rail. The contact face or the guide face of the guide rail is preferably supported on the support face. Several support faces of the carrying device may be provided. It is preferred if a support face or a section of a support face is provided on each of the opposite sides of the carrying handle. The carrying handle is advantageously located between edge regions of the support face.

It is particularly advantageous if the carrying handle projects in front of the support face when the carrying device and the guide rail are connected to each other by means of the form-fitting contours and the mating form-fitting contours.

It is for example advantageous if the guide rail has a through-opening for the carrying handle, which through-opening extends between two mutually opposite sides, in particular between the guide face and the contact face, and through which the carrying handle can be inserted. A supporting surface, in particular the above-mentioned support face, of the carrying body, is advantageously located adjacent to the carrying handle, where the guide rail is supported and/or which is provided for supporting the guide rail when the carrying handle is inserted through the through-opening. The guide rail is advantageously supported or supportable on the supporting surface or support face. The carrying handle projects at an angle, in particular a right angle, in front of the supporting surface or support face or at an angle from the supporting surface or support face. The supporting surface or support face of the carrying body is for example supported on the guide rail on the side averted from the carrying handle. The carrying handle can for example be inserted or pushed through from the guide face to the contact face or vice versa or transversely to the contact face or guide face. It is also possible, however, that the through-opening is laterally open, so that the carrying handle can be inserted into the through-opening in a direction parallel to the guide face and contact face or with a directional component which is parallel to the guide face or contact face.

The through-opening preferably has an elongated shape or is designed as a longitudinal slot. A longitudinal extent or longitudinal axis of the through-opening preferably extends parallel to the longitudinal axis of the guide rail.

It is possible that there is a distance between that section of the carrying device which carries the carrying handle and the supporting surface or support face provided for supporting the guide rail, for example if there is an indentation between the supporting surface or support face and the carrying handle. The supporting surface or support face can comprise plane surfaces or plane surface sections. It is also possible, however, that the supporting surface or support face provides a linear and/or point support of the guide rail.

It is readily possible that several supporting surfaces and/or support faces are provided on the carrying device for supporting the guide rail.

On the supporting surface or support face of the carrying device, a receptacle or indentation for the carrying handle can be provided, into which the carrying handle can be moved, for example pivoted, in an inoperative position and from which the carrying handle can be moved, for example pivoted, into an operative position for carrying the carrying device.

The through-opening preferably has an elongated shape. The through-opening preferably extends parallel or at a flat angle of less than 15° to a longitudinal axis of the guide rail.

The through-opening can be designed such that the carrying handle can be pushed through the through-opening in an inoperative position in which it is moved towards the carrying body.

The through-opening can have an inoperative position receptacle for the carrying handle, in which the carrying handle can be accommodated in an inoperative position moved towards the carrying body and/or the guide rail, in which inoperative position the carrying handle does not protrude in front of the guide rail in a position suitable for carrying the guide rail. The carrying handle is for example mounted on the carrying body for pivoting between the inoperative position and an operative position provided for carrying and can be accommodated in the inoperative position receptacle in the inoperative position.

An advantageous measure provides that the carrying handle protrudes in front of the guide face or the contact face, in particular at right angles, when the carrying device is connected to the guide rail.

The carrying handle can be arranged to be stationary on the carrying body, being thus immovable with respect to the carrying body. The carrying handle can for example extend at an angle, in particular a right angle, from the carrying body.

It is preferably provided, however, that the carrying handle is mounted on the carrying body for pivoting between an operative position, in which the carrying handle protrudes in front of the carrying body, and an inoperative position, in which the carrying handle is moved closer towards the carrying body than in the operative position. If not in use, the carrying handle can thus be moved towards the carrying body, for example.

A carrying handle capable of such adjustment can be fixed by mounting the guide rail on the carrying device. It is preferably provided that the carrying handle is fixed by the guide rail in the operative position when the guide rail and the carrying device are connected to each other. The guide rail forms a tilt protection device, for example. The carrying handle then for example bears, if the guide rail is connected to the carrying device by means of mutually engaging form-fitting contours, against one of the form-fitting contours of the guide rail or another support contour of the guide rail.

The carrying handle is in particular held in the operative position at a through-opening or by a through-opening of the guide rail, through which the carrying handle is or can be inserted.

As explained above, an indentation or receptacle can be provided for the carrying handle, in which the carrying handle is accommodated in the inoperative position. It is preferred if the carrying handle does not project in the inoperative position in front of the supporting surfaces or support faces provided for supporting the guide rail. The guide rail is or can be supported on the supporting surfaces or support faces when the carrying handle is inserted through the through-opening of the guide rail.

An advantageous measure provides that the through-opening is located approximately in the longitudinal centre with respect to the longitudinal axis of the guide rail and/or approximately in the transverse centre between longitudinal sides of the guide rail extending parallel to the longitudinal axis of the guide rail. An advantageous measure therefore provides that the carrying handle is located approximately in the longitudinal centre with respect to the longitudinal axis of the guide rail and/or approximately in the transverse centre between longitudinal sides of the guide rail extending parallel to the longitudinal axis of the guide rail when the guide rail and the carrying device are connected to each other. The guide rail is thus optimally balanced and can be carried easily. There may also be situations, however, in which such a central alignment of the guide rail is not desirable, for example if a greater distance from the person carrying the combination of carrying device and guide rail is desired.

It is furthermore advantageous if the through opening and/or the carrying handle, when the guide rail and the carrying device are connected to each other, are/is located in the centre or close to the centre of the contact face and/or the guide face of the guide rail. For this it is for example provided that the carrying handle or the through-opening is located approximately in the longitudinal centre with respect to the longitudinal axis of the guide rail and/or approximately in the transverse centre between longitudinal sides of the guide rail extending parallel to the longitudinal axis of the guide rail. The centre is the geometrical centre or the centre of gravity of the guide rail.

It is furthermore advantageous if the guide rail does not protrude in front of the carrying device transversely to its longitudinal axis when the guide rail is located on the carrying device and/or if the carrying handle is inserted through the through-opening of the guide rail.

It is also advantageous if the guide rail is completely supported by the carrying device transversely to its longitudinal axis when the guide rail is located at the carrying device and/or when the carrying handle is inserted through the through-opening of the guide rail.

A transverse width of the supporting surface or support face of the carrying device, when the guide rail is located on the carrying device, preferably corresponds at least to the transverse width of the guide rail transversely to the longitudinal axis of the guide rail, particularly of that section of the guide rail which is provided and/or designed to support the carrying device.

It is expedient if the carrying handle protrudes approximately at a right angle in front of the contact face and/or the guide face of the guide rail when the guide rail is connected to the carrying device. The carrying handle thus for example protrudes in front of large flat sides of the guide rail so as to be easily grasped.

It is advantageously provided that there is a reach-through opening provided and designed for grasping the handle section with a hand of an operator between a handle section of the carrying handle and the guide rail when the carrying handle is inserted through the through-opening and/or the guide rail is connected to the carrying device. A distance between the guide rail held on the carrying device and a handle section of the carrying handle provided for grasping with the hand of the operator is at least 2 cm, further preferred 3 cm, preferably 4 cm, for example. A minimum width of the reach-through opening is preferably at least the width of a hand, preferably the width of two hands, of an adult operator, i.e. preferably at least 8 cm, in particular at least 10 cm.

It is furthermore advantageous if the carrying handle protrudes at approximately right angles in front of a support face of the carrying body at least in its operative position. The carrying handle can be fixed and/or immovable with respect to the carrying body, i.e. for example extending from the carrying body in a static fashion and/or permanently and/or at right angles in its operative position.

The guide rail can also be provided and designed for fixing the carrying handle non-pivotably. It is preferably provided that the carrying device and the guide rail can be connected to each other by means of the form-fitting contours and the mating form-fitting contours in such a way that the carrying handle cannot be pivoted and/or displaced with respect to the guide face when the carrying device and the guide rail are connected to each other. The non-pivotability or non-displaceability can obviously be such that a certain amount of motoric play, in particular the motoric play required for releasing the connection between carrying device and guide rail, is still possible.

It is advantageously provided that the carrying handle is, in particular exclusively, insertable through the through-opening along an insertion axis extending at an angle, in particular at an approximately or fully right angle, to the longitudinal axis of the guide rail.

It is also advantageous if the guide rail, when the carrying handle is inserted through the through-opening, is supported on the carrying device in a non-pivotable or substantially non-pivotable manner. To ensure non-pivotability, it can be provided that only a motoric play required for inserting the carrying handle through the through-opening is present between the through-opening and the carrying handle. The motoric play can be generously dimensioned, but is advantageously such that, although the carrying handle can be inserted through the through-opening along the insertion axis, the guide rail and the carrying handle cannot be pivoted relative to each other in such a way that they can be brought out of or into engagement with each other by a pivoting movement about a pivoting axis extending transversely to the insertion axis. This measure therefore ensures that the guide rail is securely supported against tilting relative to the carrying device.

The form-fitting contours and the mating form-fitting contours for example comprise insertion guide faces extending parallel to the insertion axis. The form-fitting contours of the guide rail for example comprise insertion guide faces which are perpendicular to the guide face and/or to the contact face of the guide rail at the inner circumference of the through-opening for supporting and/or guiding insertion guide faces of the mating form-fitting contours provided at the carrying handle. The insertion guide faces of the mating form-fitting contours are for example provided on connecting sections or bearing sections of the carrying handle with which the carrying handle can be connected to the cover or a side wall of the transport container. The carrying handle preferably has support contours extending parallel to a longitudinal extent of the through-opening, in particular plane surfaces, e.g. plane surfaces at the connecting sections or bearing sections of the carrying handle, acting as mating form-fitting contours on which form-fitting contours of the guide rail, for example longitudinal side walls of the through-opening extending parallel to the longitudinal extent of the through-opening, are or can be supported in a planar fashion.

It is furthermore advantageous if the carrying device and/or the guide rail have/has at least one latching contour for latching to the guide rail. In this way the form-fitting connection between carrying device and guide rail is additionally secured by latching.

The latching contour can be provided at the guide rail or the carrying device. The latching contour comprises a latching projection, a latching spring or the like, for example.

It is preferred if the at least one latching contour is located at the carrying handle and/or the through-opening and latches the carrying handle to the guide rail when the carrying handle is pushed or inserted through the through-opening. The latching contour is for example located at a side face or side wall of the carrying handle and can initially be moved into a release position when the carrying handle is pushed or inserted through the through-opening of the guide rail and then automatically adopt a latching position in which the latching contour latches to the guide rail.

The carrying body can be or have a carrying plate or the like, for example. The carrying body can exclusively be provided for supporting the guide rail. The carrying handle can for example be pivotably mounted on such a carrying plate or project from a carrying plate and be insertable through the through-opening of the guide rail.

The carrying plate can for example be designed in the manner of a cover of the transport container described below.

It is preferred if the carrying body comprises a transport container with a location space for objects, in particular the hand-held power tool, or is represented by a transport container, the carrying handle being provided and designed for carrying the transport container. The location space is for example provided in a carcass of the transport container.

Although it is possible in principle for the carrying handle to be located at any point of the transport container, for example at a side wall, it is preferred if the carrying handle is located on a top side, in particular a cover, of the transport container. From the top side a storage space or location space of the transport container is accessible, for example.

The carrying handle protrudes in front of the top side of the transport container, for example, and extends through the through-opening of the guide rail. The guide rail can be supported on the top side of the transport container in a planar fashion.

It is for example preferred that the support face for supporting the guide rail is located on a top side, in particular a cover, of the transport container or at a side wall of the transport container.

It is advantageous if connecting sections or bearing sections of the carrying handle, whereby the carrying handle is connected to a side wall or cover of the transport container, are located in edge regions of the side wall or the cover. As a result the connecting sections or bearing sections can have large mutual distances. At the connecting sections or bearing sections, inner surfaces, forming or having form-fitting contours, of the through-opening of the guide rail are supported in a form-fitting manner, for example. The guide rail is for example supported on mutually spaced mating form-fitting contours of the carrying device, which are provided at the connecting sections or bearing sections of the carrying handle or represented by the connecting sections or bearing sections. In this way the guide rail can be held on the carrying device in a stable manner.

One option for connecting the guide rail to the carrying device provides that the mating form-fitting contours of the carrying device comprises at least one hook for hooking to a hook contour of the guide rail.

It is particularly advantageous if the carrying device has two or more hook contours at a mutual longitudinal distance so that the guide rail can be brought into engagement with a hook contour of the carrying device each in two positions spaced from each other with respect to their longitudinal axis.

It can for example be provided that the at least one hook is located on the carrying body at a distance from the carrying handle. Consequently a carrying handle is available on the one hand and the at least one hook on the other hand.

One advantageous measure furthermore provides that the at least one hook is located at a side wall of a or of the transport container of the carrying device. Two or further hooks can obviously be located at the side wall, in particular at a distance parallel to the top side of the transport container.

The at least one hook can be located in a fixed manner at the carrying device, for example the transport container. It is also possible, however, that the at least one hook can be retrofitted to the carrying device as it were.

It is advantageously provided that the hook is located at a hook element which can be releasably connected to the carrying device, in particular to the transport container.

For the releasable fastening of the hook element, the following measure is particularly suitable, in which it is provided that the carrying device, in particular the transport container, has a plug-in holder for inserting the hook element. The hook element can for example have a plate body which can be fixed to the transport container or to the carrying device in the manner of a card.

One advantageous concept provides that the carrying device has a latch for locking the hook element in the plug-in holder, the latch being preferably represented by a cover of the or of a transport container of the carrying device. If the hook element is now accommodated in the plug-in holder, the hook element can be locked or fixed in the plug-in holder by closing the cover of the transport container.

It is possible that the at least one hook of the carrying device and the hook contour of the guide rail can be brought into mutual engagement or out of engagement by a pivoting action or exclusively by a sliding action, in particular parallel to the longitudinal axis of the guide rail. If two or further hooks are provided at the carrying device, for example, the hook contours of the guide rail can be capable of engagement with the hooks of the carrying device by a sliding action of the guide rail. In this way a better hold of the guide rail on the carrying device, in particular the transport container, can be achievable.

BRIEF DESCRIPTION OF THE DRAWINGS

Exemplary embodiments of the invention are explained below with reference to the drawing, of which.

DETAILED DESCRIPTION

Figure 1:
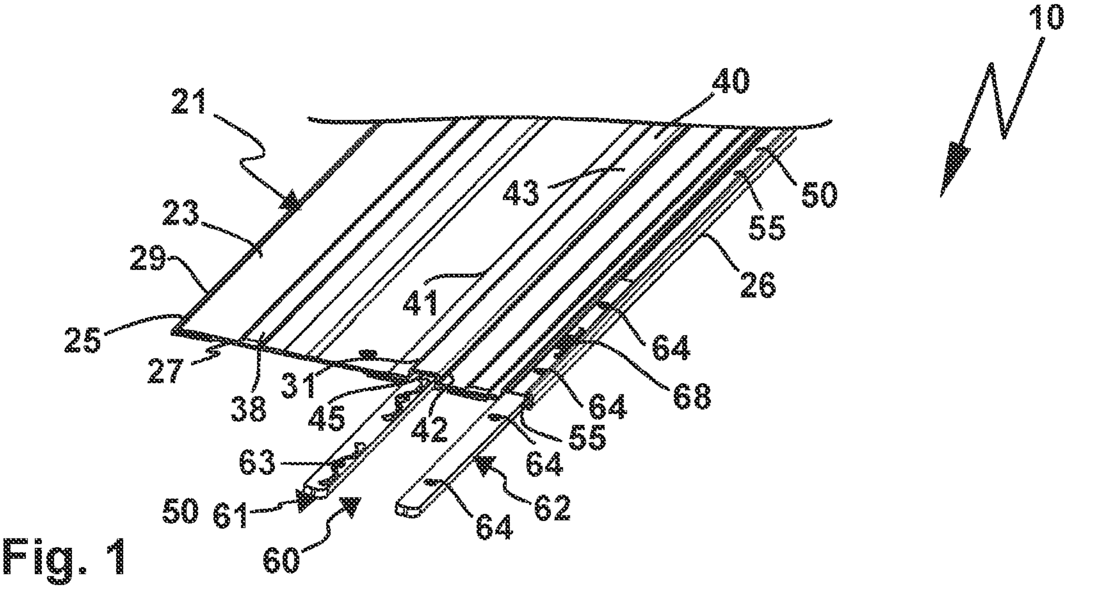
FIG. 1 shows a perspective oblique view from above of a longitudinal end of a guide rail with a connector arrangement.
Figure 2:
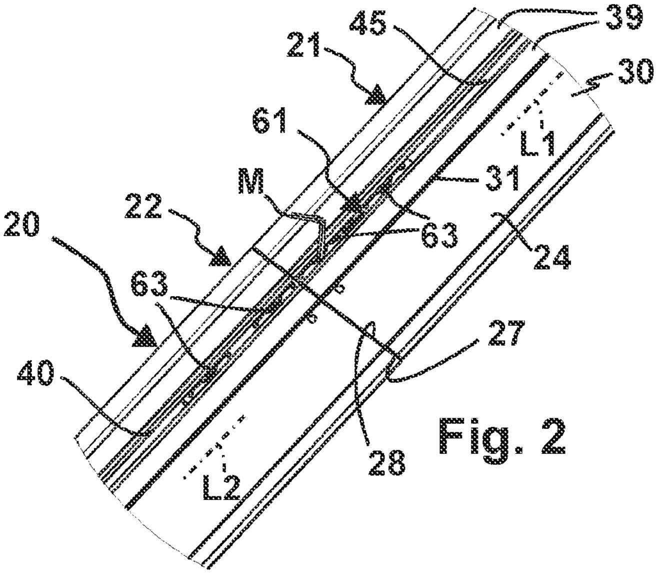
FIG. 2 shows the longitudinal end of the guide rail according to FIG. 1 in a perspective view at an angle from above, the guide rail being connected to a further guide rail by means of the connector arrangement.
Figure 4:
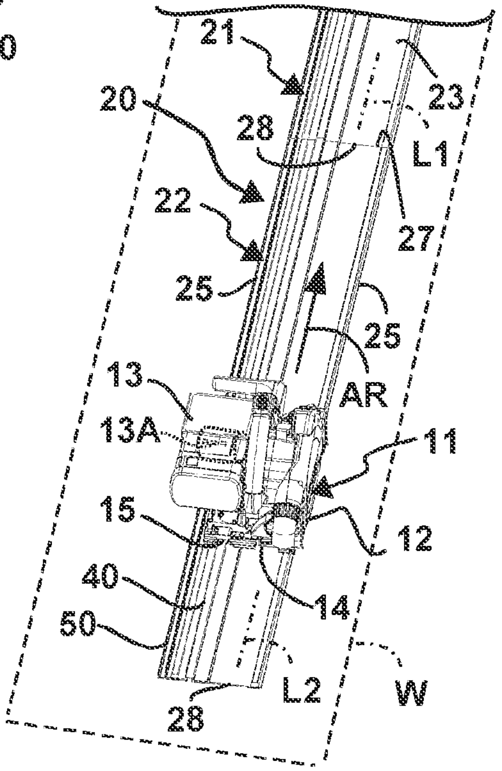
FIG. 4 shows the connected guide rails according to FIGS. 1 to 3 with a hand-held power tool guided thereon.
Figure 3:
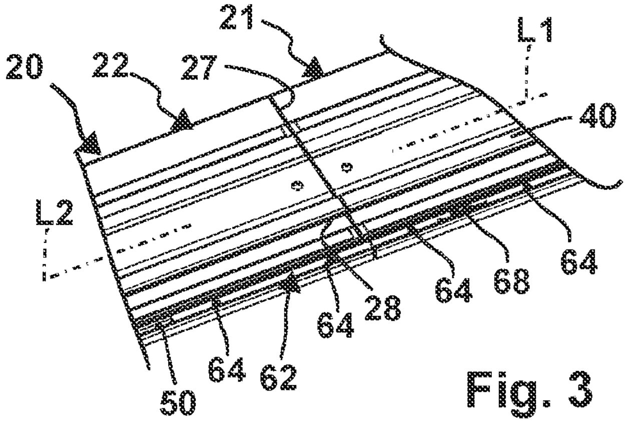
FIG. 3 shows the arrangement according to FIG. 2, but at an angle from below.
Figure 5:
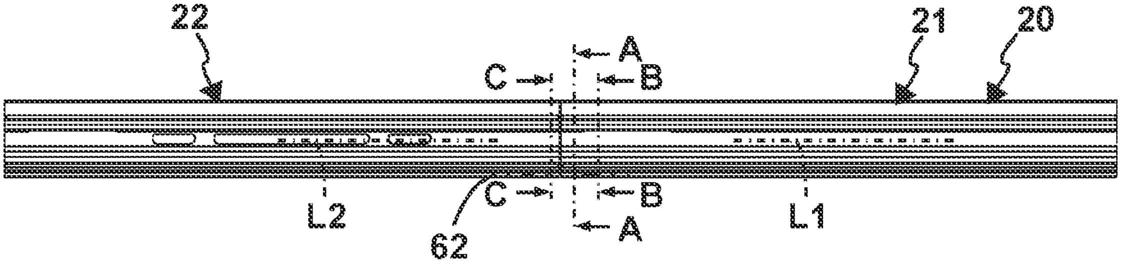
FIG. 5 shows a plan view of the connected guide rails according to FIG. 4.
Figure 6:
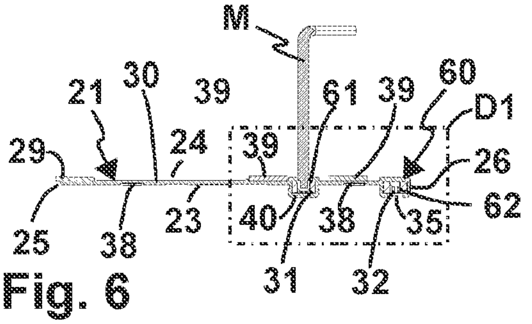
FIG. 6 shows a cross-section of the connected guide rails according to FIG. 5, approximately along a line A-A.
Figure 7:
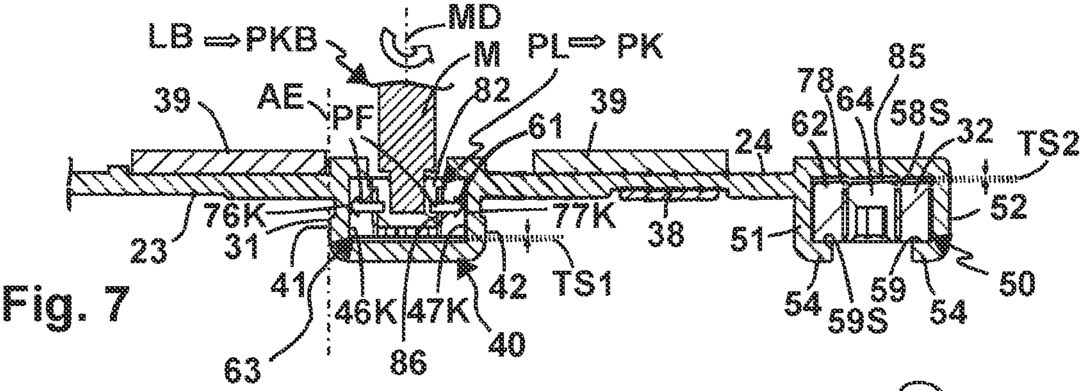
FIG. 7 shows the detail D1 from FIG. 6.

A guide rail assembly 20 is used to guide a hand-held power tool 11 on a workpiece not shown in the drawing. The hand-held power tool 11 is a sawing machine, for example, but can easily be a milling machine or a similar machine suitable for machining a workpiece as well. A drilling machine, in particular a drilling machine for drilling holes in a row adjacent to one another, can also optimally be used by means of the guide rail assembly 20. The hand-held power tool 11 in any case has a tool 12, for example a saw blade, which is held at a tool holder which can be driven by a drive motor 13A, in particular an electric drive motor. The drive motor 13A is accommodated in a housing 13 of the hand-held power tool 11, for example.

The hand-held power tool 11 furthermore has a guide plate 14, which could be described as a guide device in more general terms and which is suitable for guiding the hand-held power tool 11 on a subsurface and preferably for guiding the guide rail assembly 20 as well.

The guide rail assembly 20 has a first guide rail 21 and a second guide rail 22, with further guide rails readily possible as well. The two guide rails 21 and 22 and any further guide rails, if provided, can easily be lined up and firmly connected to one another by means of the connector arrangement 60 to be described in detail, thus forming a continuous long overall guide rail which can be used with the hand-held power tool 11 in one go, as it were.

On the guide rails 21, 22 there is located a guide projection 40, which can be brought into engagement with a guide receptacle 15 of the guide plate 14 in order to guide the hand-held power tool 11 for making a straight saw cut into a workpiece W. The hand-held power tool 11 can be guided along the guide rails 21, 22 or the guide rail assembly 20 along a working direction AR.

The guide projections 40 of the guide rails 21 and 22 are in alignment when connected to each other by the connector arrangement 60.

The guide rails 21 and 22 have substantially identical or similar components, which are explained below and provided with the same reference numbers.

The guide rails 21, 22 can be placed on a subsurface, for example the workpiece W, with their undersides or contact faces 24 and have a guide face 23 provided for guiding the hand-held power tool 11 on the side or top side opposite the contact face 24. The guide projection 40 protrudes in front of the guide face 23 for engagement with the guide receptacle 15 of the hand-held power tool 11.

The guide rails 21, 22 have an elongated shape and extend along longitudinal axes L1 and L2. The longitudinal axes L1 and L2 are in alignment with each other when the guide rails 21 and 22 are connected to each other by means of the connector arrangement 60. Also in alignment with the longitudinal axes L1 and L2 are parallel longitudinal sides 25 of the guide rails 21 and 22, past which the tool 12 or saw blade is guided when the hand-held power tool 11 is guided along the guide rail assembly 20. Even if it does not matter, longitudinal sides 24 of the guide rails 21 and 22 opposite the longitudinal sides 25 are in alignment when the guide rails 21 and 22 are connected to each other by means of the connector arrangement 60.

The guide rails 21 and 22 have end faces 27 and 28 transverse to the longitudinal axes L1 and L2, the end face 27 forming an end face in the front in the working direction AR and the end face 28 forming an end face at the rear in the working direction AR.

A guide rail 21 in the front in the working direction AR can be connected by its rear end face 28 to the end face 27 of a guide rail 22 at the rear in the working direction by means of the connector arrangement 60.

On the longitudinal side 25 of a respective guide rail 21, 22, a lip 29 is located, which serves as a tear-out protection and is cut to a suitable size by the tool 12 at the first use of the guide rail 21 or 22.

The guide rails 21, 22 have rail bodies 30, which are designed as extruded profiles, for example.

On the underside or contact face 24 of the guide rail 21, 22, one or more contact strips 39 can be provided. On the top side or guide face 23 of the guide rail 21, 22, sliding strips 38 can be provided, along which the hand-held power tool 11 can slide.

At the guide projection 40, the longitudinal guide face 31 is provided for the longitudinal guidance of the hand-held power tool 11 along the longitudinal axes L1 and L2 in the working direction AR.

The guide projection 40 is designed in the manner of a rib. Parallel to the guide projection there extends an auxiliaries receptacle 50 designed as a groove. Auxiliaries suitable for machining workpieces, components suitable for fastening the guide rail 21, 22 to a ground or the like can be accommodated in the auxiliaries receptacle 50.

The auxiliaries receptacle 50 and the guide projection 40 provide plug-in receptacles 55, 45 for connector elements 61, 62 of the connector arrangement 60, into which the connector elements 61, 62 can be inserted.

The connector element 61 and the associated plug-in receptacles 45 are provided for aligning the guide rails 21, 22 parallel to the guide face 23. The connector element 61 can also be described as a parallel connector element 61.

The connector element 62 forms a vertical connector element as it were. The connector element 62 is used to align the guide rails 21, 22 transversely to the guide faces 23.

That said, it is still clear in the following description that the connector element 61 is also designed to align the guide rails 21, 22 vertically to the guide face 23.

The guide projection 40 has side walls 41, 42 extending parallel to the longitudinal axis L1 or L2, which project at an angle from a base wall 43. The base wall 43 could also be described as a cover wall, because it actually extends into the operative position of a respective guide rail 21, 22 parallel to the guide face 23 and above the guide face 23. The description base wall 43 however conveys that the base wall 43 forms, as it were, the base of a groove, the side walls of which are the side walls 41 and 42. From the side walls 41, 42 limbs 44 protrude inwards in the direction of the plug-in receptacle 45, so that the plug-in receptacle 45 is bounded by the side walls 41, 42, the limbs 44 and the base wall 43.

The auxiliaries receptacle 50 is likewise designed as a groove, which has side walls 51, 52 which project from a base wall 53 of the auxiliaries receptacle 50. Opposite the base wall 53 limbs 54 protrude from the side walls 51 and 52 in the direction of the plug-in receptacle 45, so that this is bounded by the side walls 51, 52, the base wall 53 and the limbs 54.

The side wall 41 has on its side facing the guide face 23 a side face 46, which provides the longitudinal guide face 31. It is therefore important that the longitudinal guide faces 31 of the connected guide rails 21 and 22 are in exact alignment, so that the hand-held power tool 11 can be guided in a straight line and in particular at a transition from the longitudinal guide face 31 of the guide rail 22 to the longitudinal guide face 31 of the other guide rail 21 of the guide rail assembly 20 there is no off-set or step.

To realise such an exact alignment of the guide rails 21, 22, the measures explained in detail below are provided with the connector arrangement 60.

The connector elements 61, 62 have connector bodies 70, 70B, which are rod-shaped or have an elongated shape. The connector bodies 70, 70B have longitudinal sides 71, 72, on which are arranged the side faces 46, 47 or 56, 57 of the plug-in receptacles 44, 45. Such a top side 43 of a connector body 70, 70B is located opposite the base wall 43 or 53, whereas an underside 74 of the connector body 70 is assigned to the limbs 44 or 45. Therefore a cross-section of a respective connector body 70, 70B is formed almost identical to the cross-section of the respective plug-in receptacle 45 or 55, in which the connector body 70, 70B is inserted.

Here it must be mentioned that it is a preferred embodiment of the invention that the plug-in receptacles of the guide rails have identical plug-in cross-sections for both connector elements 61 and 62.

It is however readily possible, although not shown in the drawing, that the connector element 61 and the assigned plug-in receptacle 45 for example have a different cross-section than the connector element 62 and the assigned plug-in receptacle 55.

To connect the guide rails 21 and 22, the connector elements 61, 62 are inserted with their plug-in sections 65 in the mutually opposite plug-in receptacles 45 and 55 of the guide rails 21, 22, so that longitudinal ends 75 of the connector body 70, parallel to the longitudinal axes L1 and L2, engage particularly deep in the plug-in receptacles 45 and 55, and a longitudinal centre 66 of a respective connector element 61, 62 or a connector body 70 is approximately in the join region of the mutually opposite end faces 27 and 28 of the guide rails 21 and 22. In this way, the plug-in sections 65 penetrate almost just as deep in the assigned plug-in receptacles 45 or 55 of the guide rails.

At the connector element 61, namely its plug-in sections 65, parallel clamping devices 63 are provided for clamping the guide rails 21 and 22 which are to be connected in the plug-in receptacles 45 with a parallel clamping force PF.

One longitudinal side face 76 of the longitudinal side 71 of the connector element 61 is in contact with one side face 46 of the plug-in receptacle 45. The longitudinal side face 76 and side face 46 are used to align the guide rails 21, 22 in parallel. The side face 46 forms a parallel supporting surface 46K and the longitudinal side face 76 forms a parallel clamping face 76K. The clamping faces 46K and 76K lie in a planar fashion on each other, when the connector element 61 is clamped in the plug-in receptacle 45.

On the other longitudinal side 72 of the connector body 70 or connector element 61 a further longitudinal side face 77 is provided, which provides a parallel clamping face 77K and is located opposite a side face 47, which is opposite the side face 46 of the plug-in receptacle 45, which provides a parallel supporting surface 47K.

An underside face 78 on the underside 74 of the connector body 70 is located opposite a base wall face 78 of the base wall 73, when the plug-in section 65 is inserted in the plug-in receptacle 45.

The limbs 44 have abutment faces 49 on their sides facing the plug-in receptacle 45, on which the top side 73 of the connector body 70 is supported with sections of its top side face 79.

On each plug-in section 65 two parallel clamping devices 63 are arranged. Each parallel clamping device 63 comprises a parallel clamping body 80, which through an operation element 82 can be moved from a parallel release position PL into a parallel clamping position PK, in which the parallel clamping body 80 creates a parallel clamping force PK for clamping the plug-in section 65 in the plug-in receptacle 45.

For this the operation element 62 must be moved from a release operation position LB into a parallel clamping operation position PKB.

The parallel clamping body 80 is provided integrally by the connector body 70. The parallel clamping body 80 comprises, for example, a parallel clamping section 88 which extends along the longitudinal side 72. A face of the parallel clamping section 88 averted from the connector body 70 extends and aligns with the longitudinal side 72 of the connector body 70.

To provide the parallel clamping section 88 a slot 94 extends through the connector body 70, between the longitudinal end regions 89 of which the operation element 82 is arranged. The slot 94 has at its longitudinal end regions 89 movement gaps 90 and therefore is wider at the longitudinal end regions 89.

Longitudinal sections 91 of the slot 94 extend from the movement gaps 90 and pass over in cross-sections 92 of the slot 94, which extend from the longitudinal side 72 to the transverse centre of the connector body 70 in the direction of the longitudinal sections 93 of the slot 94, which are parallel or approximately parallel to the longitudinal axis of the connector body 70 and which in turn extend to a screw receptacle 86, in which the operation element 82 is received. The operation element 82 is for example designed as a screw 87, which is screwed in or can be screwed into the screw receptacle 86.

When therefore the operation element 82 in the screw receptacle 86 is moved from the release operation position LB in the direction of the parallel clamping operation position PKB, for example by screwing in the screw receptacle 86, the parallel clamping section 88 is deflected away from the connector body 70 transversely and outwardly, so that it acts on the parallel support surface 47K with the parallel clamping force PF. To create this spreading effect, a screw section 84 of the operation element 82 for example and/or the screw receptacle 86 is conical. As the operation element 82 is screwed further into the screw receptacle 86, the parallel clamping section 88 is spread further from the connector body 70 in the sense of a larger parallel clamping force PF.

To screw in the operation element 82 an assembly tool M is provided, for example an Allen key, wherein the assembly tool M can be inserted in a worktool receptacle 83 of the operation element 82 or the screw 87. Alternatively, a screwdriver or similar could be provided as an assembly tool M.

In the same manner, all four parallel clamping devices 63 are moved consecutively into the parallel clamping position PK.

When the guide rails 21, 22, which are aligned in such a way parallel to the guide face 23, are now connected to each other, a tensioning or clamping takes place vertically to the guide face 23.

Figure 8:
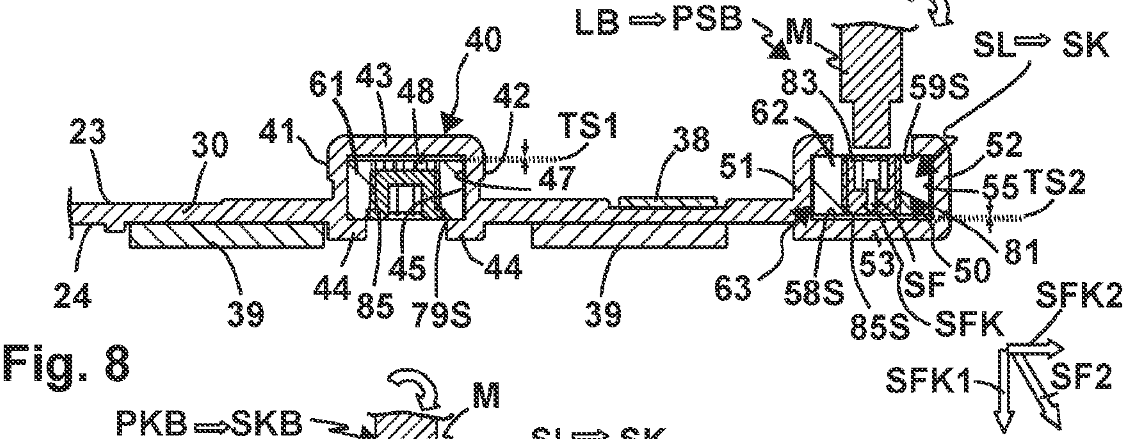
FIG. 8 shows a further cross-section of the connected guide rails according to FIG. 5, approximately along a line B-B and corresponding to the section of the detail D1.

This can be realised for example by screwing the operation element 82 further into the screw receptacle 86. For example, the operation elements 82 form vertical clamping bodies 81, which when screwed further into the screw receptacles 86, abut with the base wall face 48 of a respective plug-in receptacle 45 with their free ends 85. The free ends 85 form vertical clamping faces 85S, which can act on the base wall face 48 and therefore a vertical clamping face 85S with a vertical clamping force component SFK. The operation elements 82 of the parallel clamping devices 63 can therefore be moved from a vertical release position SL (FIG. 8) into a vertical clamping position SK, in which they tension the connector element 61 with the vertical clamping force component SFK in the plug-in receptacle 45.

Figure 9:
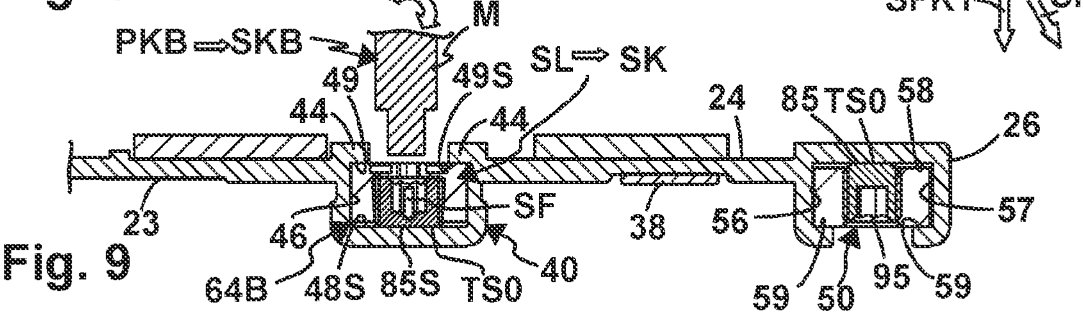
FIG. 9 shows a further cross-section of the connected guide rails according to FIG. 5, approximately along a line C-C and corresponding to the section of the detail D1.
Figure 10:
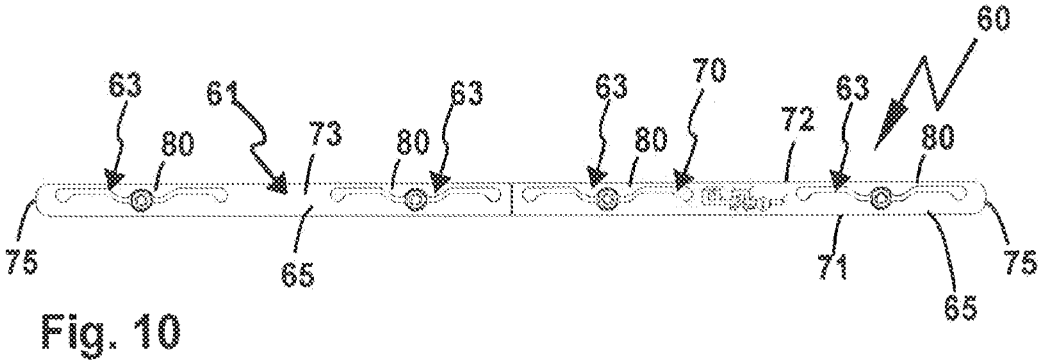
FIG. 10 shows a view from above of a first connector element of the connector arrangement with parallel clamping devices.
Figure 11:
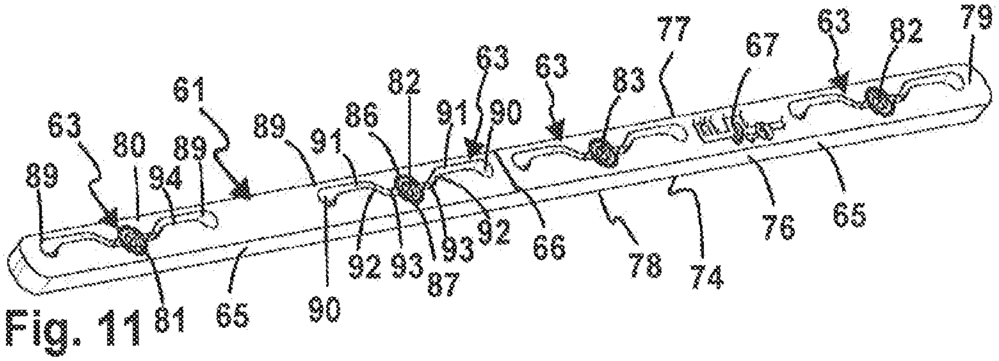
FIG. 11 shows a perspective view of the connector element according to FIG. 10.
Figure 12:
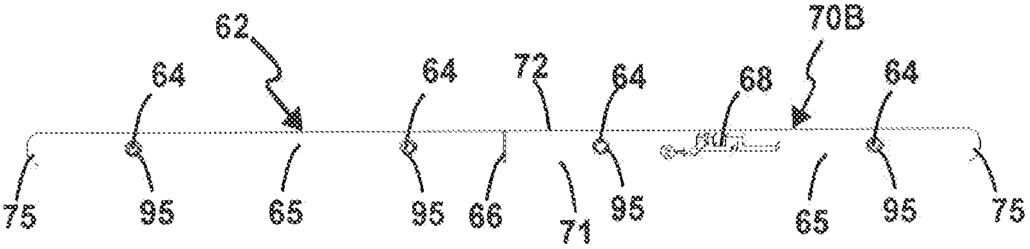
FIG. 12 shows a view from above of a second connector element of the connector arrangement with vertical clamping devices.
Figure 13:
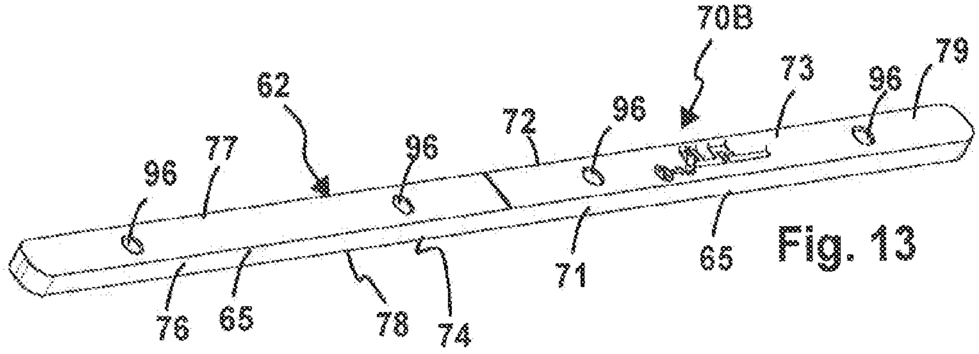
FIG. 13 shows a perspective oblique view of the connector element according to FIG. 12.
Figure 14:
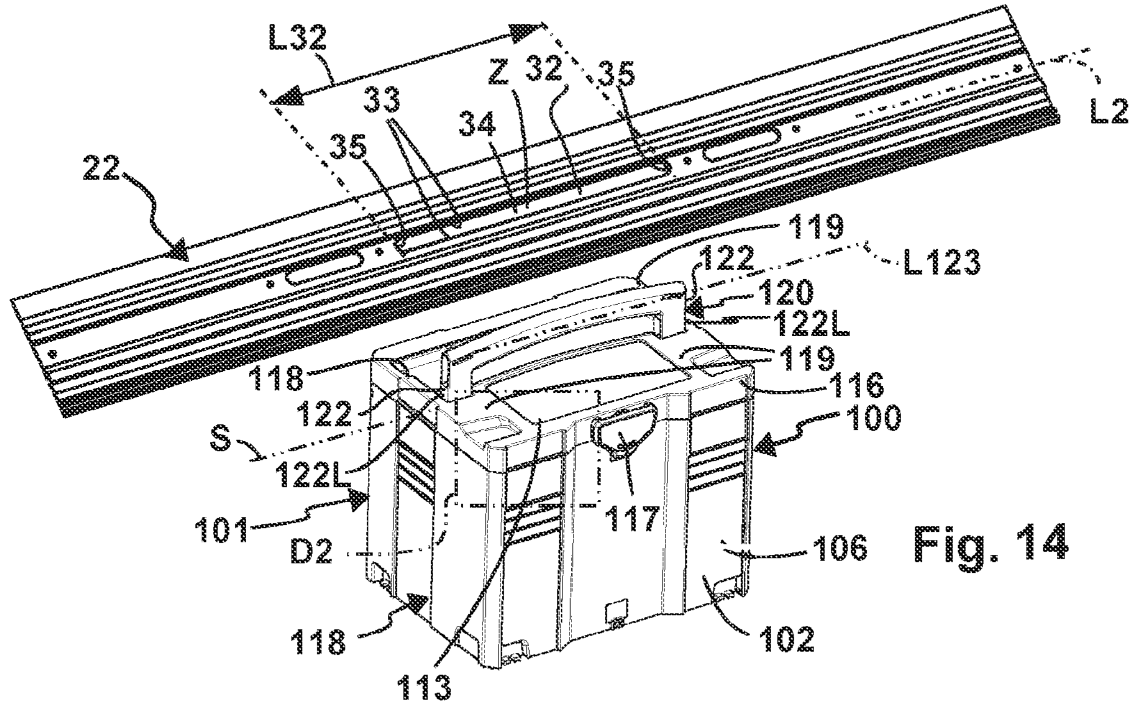
FIG. 14 shows a carrying device in the form of a transport container and a guide rail in a not yet connected state in a perspective oblique view.
Figure 15:
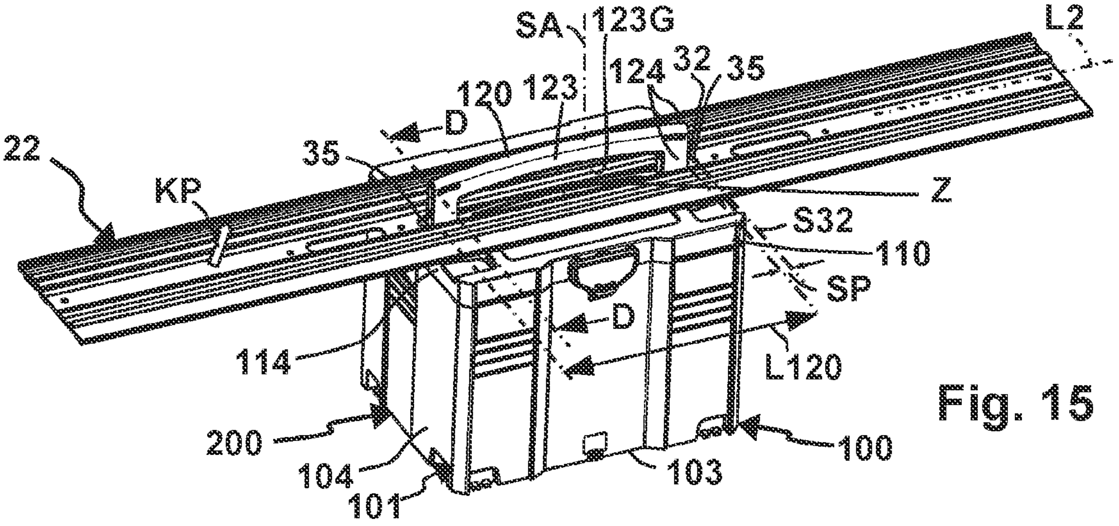
FIG. 15 shows the view according to FIG. 14, the guide rail being located on the transport container.
Figure 16:
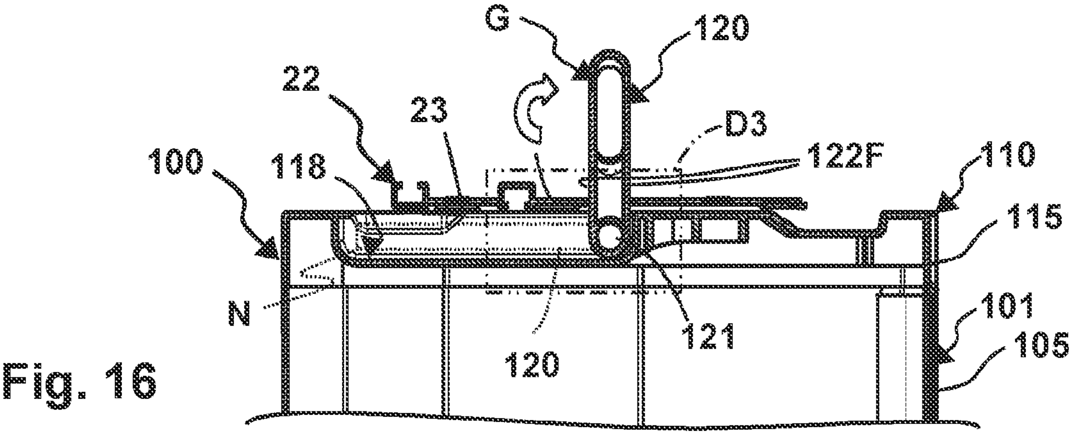
FIG. 16 shows a sectional view of an upper part of the transport container and the guide rail, approximately along a line D-D of FIG. 15.

As a result, the operation element 82 is moved from the parallel clamping operation position further into a vertical clamping operation position SKB. With this, a distance TS1 between the free ends 85 or the vertical clamping faces 85S and the vertical support surface 48S is eliminated, which is indicated by a non-existent, as it were, distance TS0 in FIG. 9. Therefore, the parallel clamping device 63 also comprises or forms a vertical clamping device 64B.

The vertical clamping force component SFK is aligned at a right angle to the guide face 23 and/or parallel to the longitudinal guide face 31.

The vertical clamping force component SFK forms for example a vertical clamping force SF. The vertical clamping force SF therefore comprises only the vertical clamping force component SFK and no clamping force component transverse to the vertical clamping force component SFK.

Tensioning for example with a vertical clamping force SF2 would also be readily possible. The vertical clamping force SF2 consists of a vertical clamping force component SFK1 vertical to the guide face 23 and a clamping force component SFK2 parallel to the guide face 23. The clamping force components SFK1 and SFK2 are, as it were, force vectors, which together form the vertical clamping force SF 2. The clamping force component SFK2 is clearly smaller than the vertical clamping force component SFK1. As a result, the vertical clamping force SF2 is aligned approximately vertically to the guide face 23 and/or vertical to the parallel clamping force SF.

The above-mentioned measure is however optional and in particular is preferably implemented when the vertical connector element 82 is previously tensioned or clamped with the plug-in receptacles 55. It is therefore not necessary that the parallel clamping device 63 also comprises or forms a vertical clamping device 64B.

The connector body 70B of the connector elements 62 is located with its longitudinal sides 71, 72 without parallel clamping force opposite side faces 56, 57 of the plug-in receptacle 55. In contrast, tensioning or clamping takes place with a vertical clamping force component SFK on abutment faces 59, which are provided on the insides of the limbs 54 facing the plug-in receptacle 55. For this, vertical clamping devices 64 are provided, which comprise screws 95 which can be screwed into screw receptacles 96 of the connector body 70B. In contrast to the screws 87 and the screw receptacles 86, the screws 95 and the screw receptacles 96 can be cylindrical. The free end regions 85 of the screws 95 are moved by screwing in the screws 95, which to an extent form vertical clamping bodies 81, to the base wall face 85, which forms a vertical support surface 85S, whereby a distance TS2 is eliminated, and consequently the vertical clamping faces 85S provided at the free ends 85 abut in a clamping position with the vertical support surface 85S, which is indicated by a non-existent, as it were, distance TS0 in FIG. 9.

Figure 17:
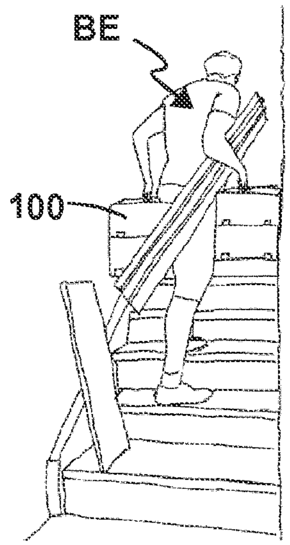
FIG. 17 shows a person carrying a guide rail without a carrying device.

We can now imagine that the transport of the elongated and accordingly unwieldy guide rails 21 and 22 is inconvenient for all practical purposes. This is made for example clear in the illustration according to FIG. 17, which shows an operator BE climbing a staircase, the operator BE holding the guide rail 21 under his one arm and carrying a transport container 100 with the other arm.

Figure 18:
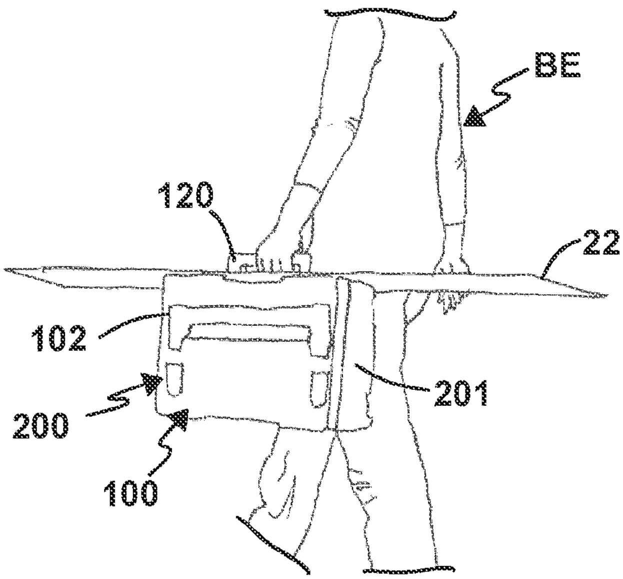
FIG. 18 shows the person according to FIG. 17, wherein the person however carries the guide rail with the carrying device according to FIGS. 15 and 16.

Much more convenient for the operator BE is the situation with the arrangement according to FIG. 18, in which the guide rail 22 rests on the transport container 100, as it were, which the operator can grasp at a handle 101 of the transport container 100. The operator thus basically carries the transport container 100, on which the guide rail 22 is fastened.

The transport container 100 for example comprises a carcass 102 with a base 103 and side walls 104, 105 and 106 projecting from the base 103. The side walls 105 and 106 extend between the side walls 104 and together therewith bound a location space 108, in which the hand-held power tool 11 can be accommodated, for example.

Figure 25:
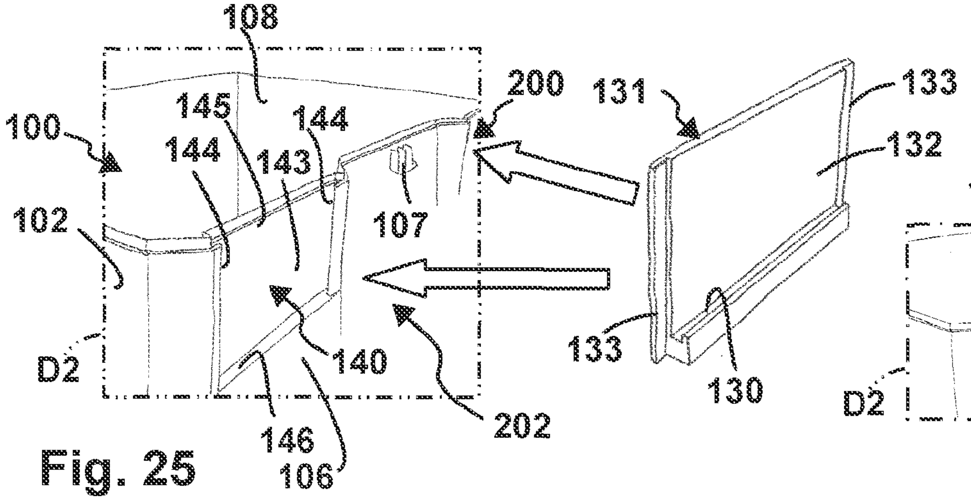
FIG. 25 shows an upper part of a transport container with a hook element not yet mounted thereon.
Figure 26:
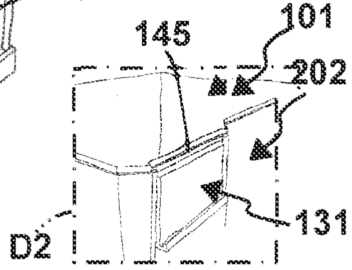
FIG. 26 shows a detailed view of the transport container according to FIG. 25 with mounted hook element.
Figure 27:
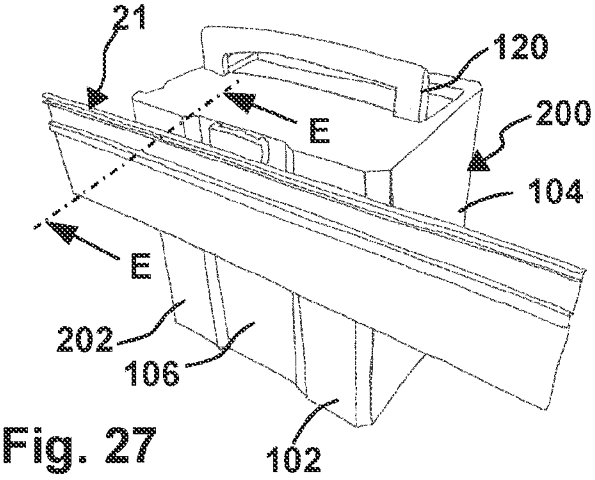
FIG. 27 shows the transport container according to FIGS. 25, 26 with a guide rail held at the hook elements of the transport container.
Figure 28:
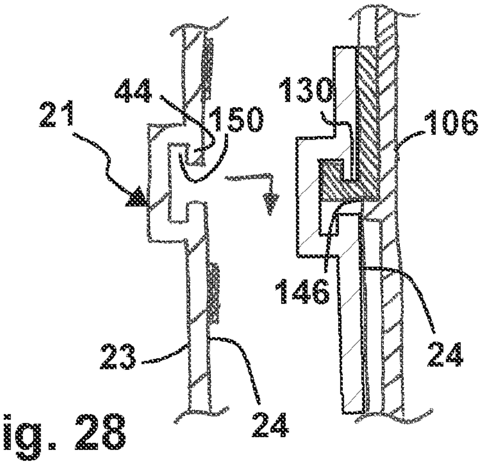
FIG. 28 shows a partial section through the arrangement according to FIG. 27, approximately along a line D-D, wherein the guide rail is still re-moved from the transport container in the left part of the illustration and attached to the transport container in the right part of the illustration.

The location space 108 can be closed by a cover 110. The cover 110 is pivotably mounted at the carcass 102, FIG. 25 showing an open position of the carcass 102. The cover 110 has a cover wall 113 and side walls 114, between which side walls 115 and 116 extend. The side walls 104 and 114 and side walls 105 and 115 and the side walls 106 and 116 are in alignment with one another when the cover 110 closes the carcass 111.

Swivel bearings not visible in the drawing are arranged between the side walls 105 and 115. The cover 110 is therefore pivotably mounted on the side wall 105.

At the side wall 116 a latch 117 is located, which can be brought into engagement with a latching contour 107 at the side wall 106 in order to close the transport container 100 reliably. The cover 110 is then firmly joined to the carcass 102.

A carrying handle 120 is located on the cover wall 113. The cover wall 113 has swivel bearings 121, by means of which the carrying handle 120 is mounted for pivoting about a pivot axis S between an inoperative position N pivoted towards the cover wall 113 and an operative position G pivoted away from the cover wall 113. In the operative position G the carrying handle 120 protrudes from the cover wall 113 and can be grasped comfortably by an operator.

The cover wall 113 has an indentation 118 for the accommodation of the carrying handle 120 in the inoperative position N.

The carrying handle 120 has bearing sections 122 at its longitudinal ends and thus in the region of the swivel bearings 121. In the region and/or by means of the bearing sections 122, the carrying handle 120 is pivotably mounted on the transport container 100 and/or the cover wall 113.

Between the bearing sections 122 extends a handle section 123, which can be grasped by the operator BE in the manner of a handhold.

The handle section 123 preferably has an elongated shape and extends along a longitudinal axis L123.

The handle section 123 and the bearing sections 122 extend at an angle to one another, for example approximately at a right angle.

The guide rail 22 has a through-opening 32 for the carrying handle 120. With its inner wall surfaces or insides 33, the through-opening 32 provides form-fitting contours 34, where the carrying handle 120 can be supported with the bearing sections 122.

Each bearing section 122 has support contours 122F on mutually opposite sides. The support contours 122F are for example represented by flat wall sections or have flat wall sections. The support contours 122F are for example plane surfaces.

The bearing sections 122 form mating form-fitting contours 124 or have mating form-fitting contours 124. The mating form-fitting contours 124 can be brought into positive engagement with the form-fitting contours 34. The mating form-fitting contours 124 comprise the support contours 122F of the bearing sections 122, for example.

The carrying handle 120 is furthermore advantageously supported positively at longitudinal ends 35 of the through-opening 32, so that the guide rail 22 is advantageously supported by the carrying handle 120 so as to be non-displaceable with respect to its longitudinal axis L2. The longitudinal end regions or longitudinal ends 35 form form-fitting contours 34 as well.

The carrying handle 120, in particular the bearing sections 122, has/have support contours 122L on opposite or mutually averted sides with respect to the longitudinal axis L2, which support contours 122L likewise form parts of the mating form-fitting contours 124 and are provided for support at the longitudinal ends 35 of the through-opening 32.

When the guide rail 22 is inserted through the through-opening 32, there is a reach-through opening 123G between the handle section 123 and the guide rail 22 held at the carrying handle 120. An operator BE can encompass the handle section 123 with his/her hand while reaching through the reach-through opening 123G.

The contact face 24 or the guide face 23 can be supported on the cover wall 113 or on support faces 119 of the cover wall 113 when the carrying handle 120 is inserted through the through-opening 32.

In addition the carrying handle 120 is fixed by the form-fitting contours 32 in its operative position G and can therefore no longer pivot into the inoperative position N. Carrying comfort is optimal.

In the drawing it can be recognised that the through-opening 32 is located approximately in the longitudinal centre with respect to the longitudinal axis L2, so that the guide rail 22 protrudes substantially to the same extent in front of the side walls 104 of the transport container 100.

The through-opening 32 is furthermore provided at the guide rail 22 approximately in the transverse centre transversely to the longitudinal axis L2.

The two above-mentioned measures ensure that the through-opening 32 is located approximately in a centre Z of the guide rail 22, thus also in a centre Z of the contact face 24 or the guide face 23 of the guide rail 22. The carrying handle 120 is therefore also in the centre Z when the guide rail 22 is located on the transport container 100.

Figure 19:
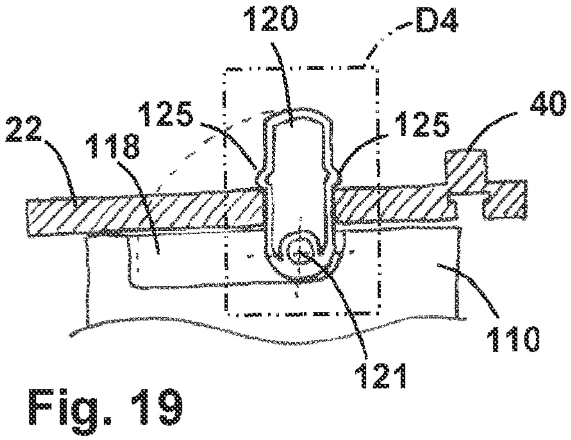
FIG. 19 shows a variant of a carrying handle with a latching contour in a view approximately corresponding to a detail D3 in FIG. 16.

For a reliable mutual hold of the form-fitting contours 34, 124 or for securing the carrying handle 120 in the through-opening 32, a latching contour 125 is advantageously provided. The latching contour 125 is for example represented by a resilient section 126 on one of the bearing sections 122. Latching contours 125 can also be provided on opposite sides of the carrying handle 120, for example, e.g. opposite sides of a bearing section 122 (see FIG. 19). Each of the bearing sections 122 can have latching contours of the type of the latching contour 125.

Figure 20A:
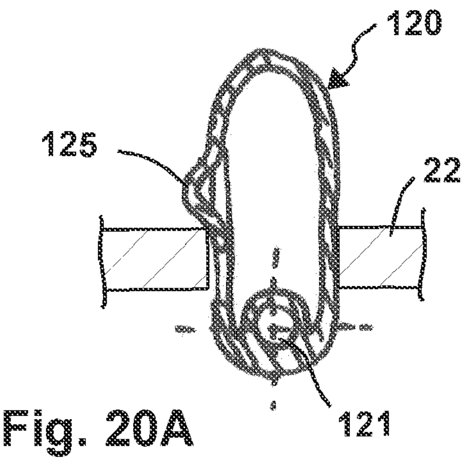
FIG. 20A shows the detail D4 from FIG. 19, the latching contour being in latching position.
Figure 20B:
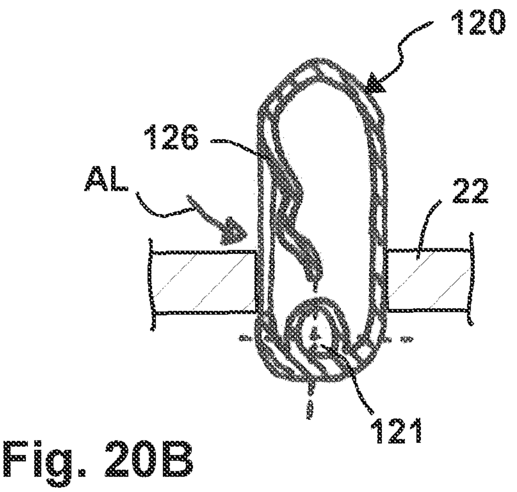
FIG. 20B shows the view according to FIG. 20A, but with the latching contour in a release position.
Figure 21:
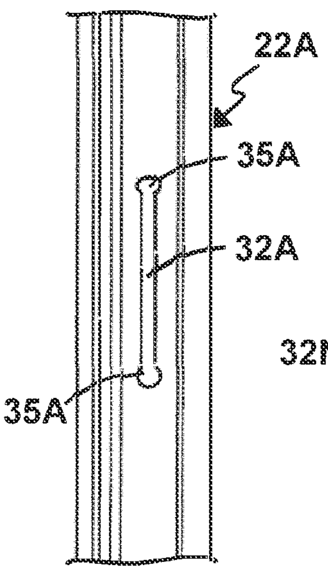
FIG. 21 shows a view from above of a central section of a first variant of a guide rail according to FIG. 14.
Figure 22:
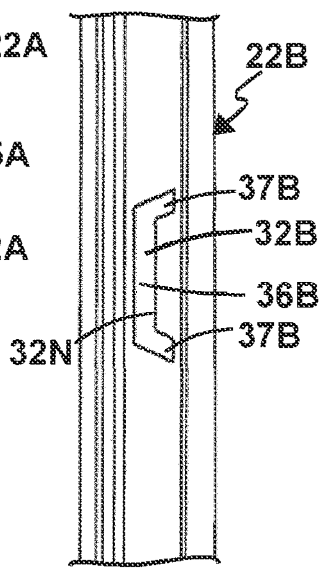
FIG. 22 shows a view from above of a central section of a second variant of a guide rail according to FIG. 14.

In FIG. 20A the latching contour 125 protrudes on front of the contact face 24 or the guide face 23 of the guide rail 22, so that the guide rail 22 is held on the cover wall 113. To release it, the latching contour 125 is deflected into a release position, for example by an operation AL (FIG. 20B), i.e. brought out of engagement with the guide rail 22, so that the carrying handle 120 can once again be guided out of the through-opening 32.

The through-opening 32 is preferably designed as a longitudinal slot. A transverse width of the longitudinal slot or the through-opening 32 transverse to the longitudinal axis L2 is constant along the entire length parallel to the longitudinal axis L2. A length L32 of the through-opening 32 between its longitudinal ends 35 is preferably dimensioned such that it corresponds to an outer distance of the bearing sections 122, i.e. the carrying handle 120 is advantageously held non-displaceably with respect to the longitudinal axis L2 in the through-opening 32 when in engagement therewith.

It is possible that the length L32 of the through-opening 32 is dimensioned such that the carrying handle 120 can only be displaced or inserted with respect to the through-opening 32 transversely to the longitudinal axis L2 or transversely to the length L32, but cannot be pivoted apart from a play required for pushing the carrying handle through to the through-opening 32, for example a play SP with respect to the longitudinal axis L123 of the carrying handle 120 which is parallel to a longitudinal axis of the through-opening 32 or to the longitudinal axis L2, when the carrying handle 120 protrudes through the through-opening 32.

Another embodiment can provide that the guide rail 22 is pivotable with respect to the carrying handle 120 for bringing the through-opening 32 into or out of engagement with the carrying handle 120. The length L2 of the through-opening 32 is for example dimensioned such that the play SP forms a pivoting play or is long enough to facilitate a pivoting play. In this case the guide rail 22 can for example be pivoted about a longitudinal end of the carrying handle 120, e.g. about a pivot axis S32, in order to bring the through-opening 32 into and/or out of engagement with the carrying handle 120. Such a pivoting movement is indicated in the drawing by an arrow KP.

Alternative through-openings are illustrated in FIGS. 21-24.

In longitudinal end regions of a through-opening 32A of a guide rail 22A, widened sections 35A are provided, for example, to facilitate an insertion of the carrying handle 120. The guide rail 22A otherwise substantially corresponds to the guide rail 22.

The guide rails 22B, 22C and 22D also largely correspond to the guide rail 22, but have through-openings 32B, 32C and 32D as alternatives to the through-opening 32.

The through-opening 32B has a central section 36B, which is assigned to the handle section 123 and from which extend sections 37B assigned to the bearing sections 122. The through-opening 32B facilitates the movement of the carrying handle 120 into the inoperative position N.

A contour of the through-opening 32B therefore corresponds to a lateral contour of the carrying handle 120, so that it can be moved from the operative position G into the through-opening 32B into the inoperative position N. The through-opening 32B thus for example forms an inoperative position receptacle 32N for the carrying handle 120. In the inoperative position N the carrying handle 120 for example protrudes not at all or only a little in front of the guide face 23 or contact face 24—averted from the cover wall 113—of the guide rail 22. The carrying handle 120 can nevertheless be pivoted out of the through-opening 32B or the inoperative position 32N into the operative position G in order to be able to carry the assembly of transport container 100 and guide rail 22B comfortably.

Figure 23:
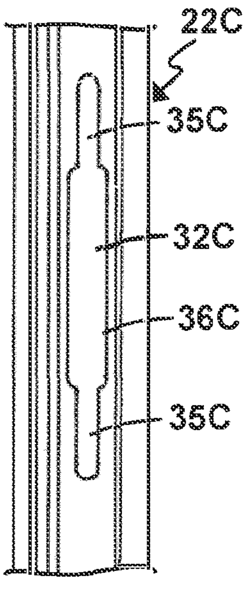
FIG. 23 shows a view from above of a central section of a third variant of a guide rail.

In the configuration according to FIG. 23, the guide rail 22C has a through-opening 32C with a central section 36C, through which the handle section 123 can be inserted, and end sections 35C, which extend from the central section 36C parallel to the longitudinal axis L2 and which are narrower than the central section 36C and provided for the form-fitting hold of the bearing sections 122 of the carrying handle 120. Through the wider central section 36C, the operator can grasp the handle section 123 of the carrying handle 120 better. The central section 36C therefore forms a kind of grip recess.

Figure 24:
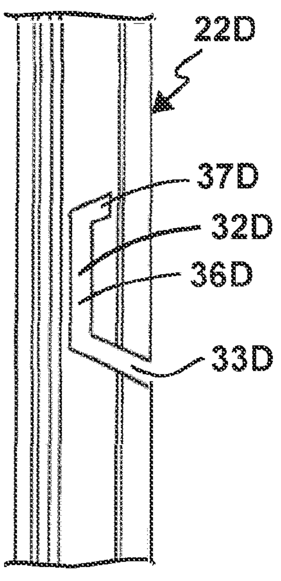
FIG. 24 shows a view from above of a central section of a fourth variant of a guide rail according to FIG. 14.

In the configuration according to FIG. 24, the guide rail 22D has a through-opening 32D having a lateral insertion opening 33C, a central section 36D and an end section 37D. The carrying handle 120 can be guided through the insertion opening 33D, threaded into the through-opening 32D in a manner of speaking, in order to establish in this way a form-fitting connection between the carrying handle 120 or the transport container 100 and the guide rail 22.

The transport container 100 thus forms a carrying device 200, the cover 110 and the cover wall 113 in particular forming a carrying body 201, from which a carrying handle 120 extends.

The front side wall 106 can also form a carrying body, however, for example the carrying body 202. Hooks 130 can be provided at the side wall 106.

The hooks 130 can for example be provided on hook elements 131, which are or can be accommodated in plug-in holders 140 at the transport container 100. The hook elements 131 for example comprise plate bodies 132 having plug-in projections 133 on opposite longitudinal sides. The plug-in projections 133 can be inserted into grooves 144 of the plug-in holders 140, the grooves 144 lying opposite one another. A flat side of the plate body 132 is in contact with a base 143 of the plug-in holder 140. The plug-in holders 140 have plug-in openings 145, through which the hook elements 131 can be inserted.

Opposite the plug-in openings 145, a support contour 146 is provided for supporting a respective hook element 131 when inserted into the plug-in holder 140. The support contour 146 and the grooves 144 extend at an angle to one another.

When the cover 110 is closed, it holds the hook elements 131 in the plug-in holders 140. The hook elements 131 are for example supported on the end face of the side wall 116 of the cover 110. The cover 110 thus forms a latch for locking a respective hook element 131 in a plug-in holder 140.

A respective hook 130 protrudes in front of the plate body 132 and is designed in the manner of a receptacle groove, for example. The hook 130 can engage with a hook contour 150 of a guide rail 21 or 22. Such a hook contour 150 is for example provided by one of the limbs 54 or 44. With the limbs 54 or 44, the guide rail 21 or 22 can be hooked into the hooks 130, wherein the contact face 24 can then be supported in a planar fashion on the front side or side wall 106 of the transport container 100, for example. The guide rail 21 or 22 therefore hangs at the front of the transport container 100, as it were, so that it can be transported comfortably.

The invention relates therefore in particular to a connector arrangement for connecting two guide rails of a guide rail assembly for guiding a hand-held power tool, wherein the guide rails extend along longitudinal axes and can be releasably connected to each other by the connector arrangement on mutually opposite end faces, wherein the guide rails have at mutually opposite sides a contact face for the guide rails to rest on a workpiece and a guide face, in front of which protrudes a longitudinal guide face extending along the respective longitudinal axis for guiding the hand-held power tool parallel to the longitudinal axis, wherein the connector arrangement has at least one connector element which has plug-in sections provided for inserting into plug-in receptacles on the opposite end faces of the guide rails on which there are arranged clamping devices for clamping in the relevant plug-in receptable. It is provided that the clamping devices of the connector arrangement are designed for sequential clamping first with a parallel clamping force approximately or exactly parallel to the guide face, so that the longitudinal guide faces of the guide rails are in alignment, and subsequently with a vertical clamping force component vertical to the guide face.

The invention claimed is:

1. A connector arrangement for connecting two guide rails of a guide rail assembly for guiding a hand-held power tool, wherein the guide rails extend along longitudinal axes and can be releasably connected with each other by the connector arrangement on mutually opposite end faces, wherein the guide rails have at mutually opposite sides a contact face for the guide rail to rest on a workpiece and a guide face for guiding the hand-held power tool, wherein the guide rails have a longitudinal guide face extending parallel to their respective longitudinal axis for guiding the hand-held power tool parallel to the respective longitudinal axis, wherein the longitudinal guide face is at an angle to the guide face, wherein the connector arrangement comprises:

at least one connector element having mutually opposite longitudinal end regions and a plug-in section on each of the mutually opposite longitudinal end regions, wherein the one plug-in section has a parallel clamping device and the other plug-in section has a vertical clamping device, the plug-in sections being provided for inserting into plug-in receptacles on the opposite end faces of the guide rails, and each clamping device being provided for clamping in the relevant plug-in receptable, and wherein the parallel clamping device of the connector element is designed for sequential clamping with at first a parallel clamping force substantially parallel to the guide face, so that the longitudinal guide faces of the guide rails are in alignment with one another, and the vertical clamping device is designed for subsequently clamping with a vertical clamping force component vertical to the guide face.

2. The connector arrangement according to claim 1, wherein the clamping devices are designed to clamp with the vertical clamping force component while retaining the alignment of the longitudinal guide faces.

3. The connector arrangement according to claim 1, wherein the at least one connector element has an elongated shape and/or is rod-shaped and/or extends along a longitudinal axis.

4. The connector arrangement according to claim 1, comprising at least one connector element with a plug-in section on which there are arranged a parallel clamping device and a vertical clamping device.

5. The connector arrangement according to claim 1, wherein the at least one connector element has longitudinal side faces at a right angle to each other, which extend parallel to a longitudinal extent of the connector element and/or parallel to an insertion axis, along which the at least connector element can be inserted into a respective one of the plug-in receptacles of one of the guide rails of the guide rail assembly.

6. The connector arrangement according to claim 1, wherein the at least one connector element has parallel clamping faces for clamping with the parallel clamping force onto parallel supporting surfaces of a respective one of the plug-in receptacles, into which the connector body is inserted, wherein the parallel clamping faces are arranged vertical to the guide face and/or parallel to the longitudinal guide face, when the at least one connector element is inserted in the respective one plug-in receptacle of a respective guide rail.

7. The connector arrangement according to claim 1, wherein the vertical clamping force component is vertical to the guide face and/or vertical to the parallel clamping force and/or wherein the clamping devices of the connector arrangement are arranged and/or provided after the alignment of the longitudinal guide faces of the guide rails with each other for clamping the guide rails exclusively with a vertical clamping force at an approximate or full right angle to the guide face and/or the parallel clamping force.

8. A guide rail assembly with a connector arrangement according to claim 1 and two guide rails, which can be connected to each other by the connector arrangement, wherein the guide rails each have on their end faces at least one plug-in receptacle for accommodating the at least one connector element.

9. The guide rail assembly according to claim 8, wherein the plug-in receptacle of at least one guide rail of the guide rail assembly has a side wall, which is provided for supporting the connector element with respect to the parallel clamping force approximately or exactly parallel to the guide face and where, on the side which is averted from the plug-in receptacle, the longitudinal guide face of the guide rail is provided.

10. The guide rail assembly according to claim 8, wherein insertion axes of the plug-in receptacles extend parallel to the longitudinal axis of the respective guide rail.

11. The guide rail assembly according to claim 8, wherein at least two of the guide rails each have at their end faces two plug-in receptacles for accommodating a connector element each.

12. The guide rail assembly according to claim 11, wherein the one plug-in receptacle is provided and arranged for clamping with the parallel clamping force approximately or exactly parallel to the guide face and the other plug-in receptacle is provided and arranged for clamping with the vertical clamping force component vertically to the guide face.

13. The guide rail assembly according to claim 8, wherein the plug-in receptacles of one guide rail are open to faces, which are opposite each other averted from the end faces or at an angle to the end faces, and/or the one plug-in receptacle is open to the guide face and the other plug-in receptacle is open to the contact face.

14. The guide rail assembly according to claim 8, comprising at least one guide rail with a plug-in receptacle, into which at least two plug-in sections can be inserted by connector elements of the connector arrangement.

15. A connector arrangement for connecting two guide rails of a guide rail assembly for guiding a hand-held power tool, wherein the guide rails extend along longitudinal axes and can be releasably connected with each other by the connector arrangement on mutually opposite end faces, wherein the guide rails have at mutually opposite sides a contact face for the guide rail to rest on a workpiece and a guide face for guiding the hand-held power tool, wherein the guide rails have a longitudinal guide face extending parallel to their respective longitudinal axis for guiding the hand-held power tool parallel to the respective longitudinal axis, wherein the longitudinal guide face is at an angle to the guide face, wherein the connector arrangement comprises:

at least one connector element which has plug-in sections provided for inserting into plug-in receptacles on the opposite end faces of the guide rails on which there are arranged clamping devices for clamping in the relevant plug-in receptable, and wherein the clamping devices of the connector element are designed for sequential clamping with at first a parallel clamping force substantially parallel to the guide face, so that the longitudinal guide faces of the guide rails are in alignment with one another, and subsequently with a vertical clamping force component vertical to the guide face, and wherein the at least one connector element comprises a first connector element that has a plug-in section on each of the mutually opposite longitudinal end regions and a second connector element that has a plug-in section on each of the mutually opposite longitudinal end regions, on which there are arranged on the plug-in sections of the connector elements either exclusively a parallel clamping device or exclusively a vertical clamping device.

16. The connector arrangement according to claim 15, wherein there are arranged on the plug-in sections of the first connector element exclusively parallel clamping devices and on the plug-in sections of the second connector element exclusively vertical clamping devices.

17. The connector arrangement according to claim 15, wherein the first connector element and the second connector element are circumferentially equally shaped and/or are equally long and/or have the same cross-sections.

18. A connector arrangement for connecting two guide rails of a guide rail assembly for guiding a hand-held power tool, wherein the guide rails extend along longitudinal axes and can be releasably connected with each other by the connector arrangement on mutually opposite end faces, wherein the guide rails have at mutually opposite sides a contact face for the guide rail to rest on a workpiece and a guide face for guiding the hand-held power tool, wherein the guide rails have a longitudinal guide face extending parallel to their respective longitudinal axis for guiding the hand-held power tool parallel to the respective longitudinal axis, wherein the longitudinal guide face is at an angle to the guide face, wherein the connector arrangement comprises:

at least one connector element which has plug-in sections provided for inserting into plug-in receptacles on the opposite end faces of the guide rails on which there are arranged clamping devices for clamping in the relevant plug-in receptable, and wherein the clamping devices of the connector element are designed for sequential clamping with at first a parallel clamping force substantially parallel to the guide face, so that the longitudinal guide faces of the guide rails are in alignment with one another, and subsequently with a vertical clamping force component vertical to the guide face, and wherein at least one clamping device has a parallel clamping body for clamping in the plug-in receptacle with the parallel clamping force and one vertical clamping body separate from the parallel clamping body for clamping in the plug-in receptacle with the vertical clamping force component.

19. The connector arrangement according to claim 18, wherein the vertical clamping body forms an operation element for the parallel clamping body, wherein the vertical clamping body can be moved from a release operation position into a parallel clamping operation position, wherein in the release operation position the vertical clamping body adopts a vertical release position and the parallel clamping body a parallel release position, wherein the vertical release position and the parallel release position are provided and designed for moving the connector element with respect to the plug-in receptacle, and in the parallel clamping operation position the parallel clamping body adopts a parallel clamping position provided for and suitable for supporting the plug-in section with the parallel clamping force in the plug-in receptacle and the vertical clamping body adopts a vertical release position, and wherein the vertical clamping body can be operated from the parallel clamping operation position into a vertical clamping operation position, in which the vertical clamping body adopts a vertical clamping position provided for and suitable for supporting the plug-in section with the vertical clamping force component in the plug-in receptacle.

20. The connector arrangement according to claim 18, wherein the vertical clamping body is designed as a screw, wherein a longitudinal end region of the screw protrudes further in front of the connector element in the vertical clamping position than in the vertical release position and/or the screw has a conical outer circumference and/or the screw is received in a conical screw receptacle.

21. A connector arrangement for connecting two guide rails of a guide rail assembly for guiding a hand-held power tool, wherein the guide rails extend along longitudinal axes and can be releasably connected with each other by the connector arrangement on mutually opposite end faces, wherein the guide rails have at mutually opposite sides a contact face for the guide rail to rest on a workpiece and a guide face for guiding the hand-held power tool, wherein the guide rails have a longitudinal guide face extending parallel to their respective longitudinal axis for guiding the hand-held power tool parallel to the respective longitudinal axis, wherein the longitudinal guide face is at an angle to the guide face, wherein the connector arrangement comprises:

at least one connector element which has plug-in sections provided for inserting into plug-in receptacles on the opposite end faces of the guide rails on which there are arranged clamping devices for clamping in the relevant plug-in receptable, and wherein the clamping devices of the connector element are designed for sequential clamping with at first a parallel clamping force substantially parallel to the guide face, so that the longitudinal guide faces of the guide rails are in alignment with one another, and subsequently with a vertical clamping force component vertical to the guide face, and wherein the at least one connector element has a connector body with a parallel clamping section, which is integral or firmly connected to the connector body and can be moved by an operation element between a parallel clamping position provided for and suitable for supporting one of the plug-in sections with the parallel clamping force in the relevant plug-in receptacle and a parallel release position, which is provided and designed for moving the connector element with respect to the relevant plug-in receptacle.

22. The connector arrangement according to claim 21, wherein the parallel clamping section at its longitudinal end regions is integral or firmly connected to the connector body and/or is designed as a type of clasp and/or is arranged on one longitudinal side of the connector element parallel to one longitudinal extent of the connector element.

23. The connector arrangement according to claim 21, wherein, on at least one longitudinal end region of the parallel clamping section which is integral or firmly connected to the connector body, a movement gap is arranged, which facilitates a deflection of the parallel clamping section in the parallel clamping position.

24. The connector arrangement according to claim 21, wherein the operation element is arranged between the connector body and the parallel clamping section and/or comprises a screw.

* * * * *